US008812880B2

(12) United States Patent
Kasahara et al.

(10) Patent No.: US 8,812,880 B2
(45) Date of Patent: Aug. 19, 2014

(54) MULTIPROCESSOR SYSTEM AND MULTIGRAIN PARALLELIZING COMPILER

(75) Inventors: Hironori Kasahara, Shinjuku-ku (JP); Keiji Kimura, Shinjuku-ku (JP); Jun Shirako, Shinjuku-ku (JP); Masaki Ito, Machida (JP); Hiroaki Shikano, Kokubunji (JP)

(73) Assignee: Waseda University, Tokyo (JP)

( * ) Notice: Subject to any disclaimer, the term of this patent is extended or adjusted under 35 U.S.C. 154(b) by 227 days.

(21) Appl. No.: 12/654,956

(22) Filed: Jan. 11, 2010

(65) Prior Publication Data

US 2010/0146310 A1 Jun. 10, 2010

Related U.S. Application Data

(62) Division of application No. 11/660,104, filed as application No. PCT/JP2006/308161 on Apr. 12, 2006, now Pat. No. 7,895,453.

(30) Foreign Application Priority Data

Apr. 12, 2005 (JP) ................................. 2005-114842

(51) Int. Cl.
*G06F 1/00* (2006.01)
*G06F 9/50* (2006.01)
*G06F 1/32* (2006.01)
*G06F 9/45* (2006.01)
*G06F 9/48* (2006.01)

(52) U.S. Cl.
CPC ........... *G06F 9/5044* (2013.01); *Y02B 60/1282* (2013.01); *G06F 1/329* (2013.01); *G06F 8/456* (2013.01); *G06F 1/3203* (2013.01); *G06F 9/4893* (2013.01); *Y02B 60/1278* (2013.01); *Y02B 60/142* (2013.01); *Y02B 60/144* (2013.01); *Y02B 60/1285* (2013.01); *G06F 1/3296* (2013.01); *G06F 9/5094* (2013.01); *G06F 1/324* (2013.01); *G06F 1/3287* (2013.01); *Y02B 60/1217* (2013.01)
USPC ........................................................ 713/300

(58) Field of Classification Search
USPC ........................................................ 713/300
See application file for complete search history.

(56) References Cited

U.S. PATENT DOCUMENTS 5,461,266 A 10/1995 Koreeda et al.
5,630,110 A 5/1997 Mote, Jr.
(Continued)

FOREIGN PATENT DOCUMENTS

CN 1183150 A 6/1996
CN 1295583 C 8/2004
(Continued)

OTHER PUBLICATIONS

International Search Report of PCT/JP2006/308161 mailed Jul. 4, 2006.
(Continued)

*Primary Examiner* — Mohammed Rehman
(74) *Attorney, Agent, or Firm* — Juan Carlos A. Marquez; Morris, Manning & Martin, LLP

(57) ABSTRACT

Provided is a multiprocessor system and a compiler used in the system for automatically extracting tasks having parallelism from an input program to be processed, performing scheduling to efficiently operate processor units by arranging the tasks according to characteristics of the processor units, and generating codes for optimizing a system frequency and a power supply voltage by estimating a processing amount of the processor units.

6 Claims, 28 Drawing Sheets

(56) References Cited

U.S. PATENT DOCUMENTS

| | | | |
|---|---|---|---|
| 5,637,932 A | 6/1997 | Koreeda et al. | |
| 5,778,237 A | 7/1998 | Yamamoto et al. | |
| 5,996,083 A | 11/1999 | Gupta et al. | |
| 6,381,676 B2 * | 4/2002 | Aglietti et al. | 711/133 |
| 6,484,041 B1 | 11/2002 | Aho et al. | |
| 6,956,579 B1 * | 10/2005 | Diard et al. | 345/537 |
| 7,870,400 B2 * | 1/2011 | Kenkare et al. | 713/300 |
| 2003/0065960 A1 | 4/2003 | Rusu et al. | |
| 2005/0034002 A1 | 2/2005 | Flautner | |
| 2005/0066330 A1 | 3/2005 | Kanai et al. | |
| 2006/0005082 A1 * | 1/2006 | Fossum et al. | 714/42 |
| 2006/0031679 A1 * | 2/2006 | Soltis et al. | 713/182 |
| 2006/0268861 A1 * | 11/2006 | Sonoda et al. | 370/389 |
| 2006/0294348 A1 * | 12/2006 | Sugure et al. | 712/244 |
| 2006/0294398 A1 * | 12/2006 | Morris et al. | 713/300 |

FOREIGN PATENT DOCUMENTS

| | | |
|---|---|---|
| CN | 1581023 A | 8/2004 |
| EP | 0 992 876 A2 | 4/2000 |
| EP | 0 992 876 A3 | 1/2004 |
| JP | 04-195619 | 11/1990 |
| JP | 07-287699 | 1/1995 |
| JP | 11-272490 | 3/1998 |
| JP | 2001-117653 | 10/1999 |
| JP | 2001-175619 | 12/1999 |
| JP | 2004-038642 | 7/2002 |
| JP | 2004-199139 | 12/2002 |
| JP | 2004-234126 | 1/2003 |
| JP | 2004/252728 | 2/2003 |
| JP | 2004-252900 | 2/2003 |
| JP | 2005-062956 | 8/2003 |

OTHER PUBLICATIONS

Chinese Office Action dated May 9, 2008 for the Chinese application No. 2006800006660, in Chinese language.

Office Action from Japanese Patent Office mailed Oct. 27, 2009, in Japanese.

Hiroshi Koide et al., "Meta-Scheduling", bit, vol. 33, No. 4, Kyoritsu Shuppan Co., Ltd., Apr. 1, 2001, pp. 36-41 in Japanese with English abstract.

European Search Report of Application No. EP 06732068.9-1243/1870792, dated Oct. 6, 2010.

Office Action from European Patent Office for corresponding European Patent Application 06 732 068.9-1957 dated May 14, 2013.

European Patent Office Communication pursuant to Article 94(3) EPC issued Aug. 3, 2011 in the corresponding European Application No. 06 732 068.9-1243 (5 pages).

* cited by examiner

CLOCK PULSE SELECTOR (CLKSEL)

FIG.9

| MODE | VALUE OF THE FREQUENCY AND VOLTAGE CONTROL REGISTER | SUPPLY VOLTAGE (VL) | SYSTEM CLOCK (FL) |
|---|---|---|---|
| OFF | 00 | 0 (CUT OF) | 0 (CUT OFF) |
| LOW | 01 | ½ VD | ¼ FC |
| MIDDLE | 10 | ¾ VD | ½ FC |
| FULL | 11 | VD (SYSTEM VOLTAGE) | FC (SYSTEM CLOCK) |

FIG.13

| MODE | VALUE OF THE FREQUENCY AND VOLTAGE CONTROL REGISTER | SUPPLY VOLTAGE (VL) | SYSTEM CLOCK (FL |
|---|---|---|---|
| OFF<br>COMPLETELY CUT OFF | 00 | 0<br>(CUT OF) | 0<br>(CUT OF) |
| SLP<br>DATA HOLD | 01 | ½ VD | 0 |
| FULL<br>NORMAL | 11 | VD<br>(SYSTEM VOLTAGE) | FC<br>(SYSTEM CLOCK) |

FIG.14c

| ADDRESS | FIELD | 0 |
|---|---|---|
| PUx_FV | | PU FV |
| PUx_LM0_FV | | LM0 FV |
| PUx_LM1_FV | | LM1 FV |
| PUx_LM2_FV | | LM2 FV |
| PUx_LM3_FV | | LM3 FV |

FIG.15

| 250 | 251 | 252 | 253 | 254 | 255 | 256 |
|---|---|---|---|---|---|---|
| PUN | PUFV | LM0 FV | LM1 FV | LM2 FV | LM3 FV | BUS FV |
| 0 | 01 | 11 | 01 | 00 | 00 | 11 |
| ⋮ | ⋮ | ⋮ | ⋮ | ⋮ | ⋮ | ⋮ |

FIG.17b

```
                                            ┌─ OBJECT CODE

; FV REGS ADDRESS SET

; Obtain a registers top address for each PU
CPU0_REG_ADRS          .EQU       CPU0_TOP_ADRS+SYSREG_OFFSET
DSP0_REG_ADRS          .EQU       DSP0_TOP_ADRS+SYSREG_OFFSET
DSP1_REG_ADRS          .EQU       DSP1_TOP_ADRS+SYSREG_OFFSET ; Obtain an FV register address for each PU
CPU0_FVREG_ADRS        .EQU       CPU0_REG_ADRS+FVREG_OFFSET
DSP0_FVREG_ADRS        .EQU       DSP0_REG_ADRS+FVREG_OFFSET
DSP1_FVREG_ADRS        .EQU       DSP1_REG_ADRS+FVREG_OFFSET ; Set the target FV register for DSP0
MOV.L         #DSP0_FVREG_ADRS,R0     ; Set target reg. address to R0
MOV.W         #H'0000001D,R1                    ; Set fv reg. value to R1
MOV.W         R1,@R0                  ; Determine the mode setting
```

FIG.17c

```
                  ┌─ OBJECT CODE set_fv_regs(TYPE OF PU, FV MODE OF PU, FV MODE OF LM BANK 0, BANK 1, BANK 2, BANK 3 );

EXAMPLE)   set_fv_regs( CPU0, MID, FULL, SLP, OFF, OFF );
```

```
   /* MT1_1                              /* ~ */
*/ for (j = 0; j < m; j++)               ARE
      scanf( "%d %d" , &a[0][j], &x[j]); COMMENTS /* MT1_2 */
   for (i = 1; i < n; i++) {
      /* MT1_2_1 */
      for (j = 0; j < m; j++) a[i][j] = a[i-1][j];

/* MT1_2_2 */
      func1(a, b);

/* MT1_2_3 */
      func2(b, c);

/* MT1_2_4 */
      for (j = 0; j < m; j++) d[i][j] = a[i][j] * 2;

/* MT1_2_5 */
      for (j = 0; j < m; j++) e[i][j] = a[i][j] / 2;

/* MT1_2_6 */
      func3(d, e, f);
   }

/* MT1_3 */
   func4(x, y, z);
} void func4(x, y, z)
{
   /* MT1_3_1 */
   t = (x(0) + x(m)) / 2
   if (t > g(m/2)) {
      /* MT1_3_2 */
      for (j = 0; j < m; j++) y[j] = x[j] * 2;

/* MT1_3_3 */
      for (j = 0; j < m; j++) z[j] = x[j] + 1;

/* MT1_3_4 */
      func4a(x, y, z);
   } else {
      /* MT1_3_5 */
      func4b(x, y, z);

/* MT1_3_6 */
      for (j = 0; j < m; j++) y[j] = x[j] + 2;

/* MT1_3_7 */
      for (j = 0; j < m; j++) z[j] = x[j] + 3;
   }
}
```

FIG.24

| EXECUTION CODES FOR CPU 0 | EXECUTION CODES FOR DSP 0 | EXECUTION CODES FOR DRP 0 | EXECUTION CODES FOR BMP 0 |
|---|---|---|---|
| POWER SUPPLY AND FV CONTROL DIRECTIVE<br>( $V_{CPU0}$= full, $V_{DSP0}$= off, $V_{DSP1}$= off, $V_{DRP0}$= off, $V_{DRP1}$= off, $V_{BMP0}$= off, $V_{BMP1}$= off )<br><br>/* MT1_1 */<br>for( ... ) scanf( ... );<br>POWER SUPPLY AND FV CONTROL DIRECTIVE<br>( $V_{CPU1}$= full )<br><br>/* MT1_2 */<br>for( ... ) {<br>  /* MT1_2_1 */<br>  for( ... ) a[i][j] = ...,<br>POWER SUPPLY AND FV CONTROL DIRECTIVE<br>( $V_{CPU0}$= low, $V_{DSP0}$= full, $V_{DRP0}$= mid, $V_{DRP1}$= mid )<br>ISSUE ACTIVATION COMMAND OF TASK<br><br>STANDBY OF EXECUTION COMPLETION<br>( MT1_2_4, MT1_2_5<br>  STAND BY UNTIL EXECUTION COMPLETION )<br>POWER SUPPLY AND FV CONTROL DIRECTIVE<br><br>( $V_{CPU0}$= high, $V_{DRP0}$= off, $V_{DRP1}$= off )<br><br>/* MT1_2_6 */<br>func3( ... );<br>POWER SUPPLY AND FV CONTROL DIRECTIVE<br><br>( $V_{DSP0}$= off )<br><br><br>} | for( ... ) {<br><br><br><br><br><br><br><br><br><br><br><br><br><br><br><br><br><br><br><br><br>/* MT1_2_2 */<br>func1( ... );<br><br>/* MT1_2_3 */<br>func2( ... );<br>STANDBY OF POWER SUPPLY AND FV CONTROL<br><br><br><br><br><br><br><br><br>} | for( ... ) {<br><br><br><br><br><br><br><br><br><br><br><br><br><br><br><br><br><br><br><br><br>/* MT1_2_4 */<br>for( ... ) b[i][j] = ...;<br>STANDBY OF POWER SUPPLY AND FV CONTROL<br><br><br><br><br><br><br><br><br><br>} | for( ... ) {<br><br><br><br><br><br><br><br><br><br><br><br><br><br><br><br><br><br><br><br><br>/* MT1_2_5 */<br>for( ... ) b[i][j] = ...;<br>STANDBY OF POWER SUPPLY AND FV CONTROL<br><br><br><br><br><br><br><br><br><br>} |

FIG.25

| EXECUTION CODES FOR CPU 1 | EXECUTION CODES FOR DSP 1 | EXECUTION CODES FOR DRP 1 | EXECUTION CODES FOR BMP 1 |
|---|---|---|---|
| ALLOCATING TASK. ACTIVATING POWER SUPPLY AND FV CONTROL SCHEDULER. ( MT1_3 IS ALLOCATED IN CPU 0 )<br><br>/* MT1_3_1 */<br>n = ...;<br><br>ALLOCATING TASK. ACTIVATING POWER SUPPLY AND FV CONTROL SCHEDULER. ( MT1_3_2 IS ALLOCATED IN DSP 1, MT1_3_3 IS ALLOCATED IN BMP 0. ISSUE FV CONTROL COMMAND )<br><br>( $V_{CPU1}$= low, $V_{DSP1}$= full, $V_{BMP0}$= low )<br><br>ISSUE ACTIVATION COMMAND OF TASK. STANDBY OF EXECUTION COMPLETION. ( STANDBY UNTIL COMPLETION OF MT1_3_2 AND MT1_3_3 )<br><br>ALLOCATING TASK. ACTIVATING POWER SUPPLY AND FV CONTROL SCHEDULER. ( MT1_3_4 IS ALLOCATED IN CPU 1, ISSUE FV CONTROL COMMAND)<br><br>( $V_{CPU1}$= full, $V_{DSP1}$= off, $V_{BMP0}$= off )<br><br>/* MT1_3_4 */<br>func4a( ... ); | /* MT1_3_2 */<br>for( ... ) d[i] = ...;<br><br>STANDBY OF SCHEDULER | /* MT1_3_3 */<br>for( ... ) e[i] = ...;<br><br>STANDBY OF SCHEDULER | |

MULTIPROCESSOR SYSTEM AND MULTIGRAIN PARALLELIZING COMPILER

CROSS-REFERENCE TO RELATED APPLICATIONS

This application is a Divisional application of U.S. application Ser. No. 11/660,104 filed on Feb. 13, 2007 now U.S. Pat. No. 7,895,453, which is a national stage application of PCT/JP2006/308161 filed on Apr. 12, 2006, the disclosures of which are hereby incorporated by reference. The present application claims priority from U.S. application Ser. No. 11/660,104 filed on Feb. 13, 2007, which claims priority from National Stage Application PCT/JP2006/308161 filed on Apr. 12, 2006, which claims priority from Japanese Application 2005-114842 filed on Apr. 12, 2005, the content of which is hereby incorporated by reference into this application.

TECHNICAL FIELD

This invention relates to a hardware configuration that can be adopted for a multiprocessor system constituted of a plurality of processor units for enabling efficient operation of the plurality of processor units in the multiprocessor system, and to a compiler for generating programs used in the multiprocessor system.

BACKGROUND ART

Device miniaturization due to a progress in a semiconductor manufacturing technology has enabled integration of a huge number of transistors. Simultaneously, a progress has been made in achieving higher operation frequencies of a processor. However, an increase of operation power and an increase of standby power caused by a leakage current, the limit has begun to be seen in performance improvement of a processor which has been achieved conventionally by increasing operation frequency and improving a logical system.

Therefore, at present, as means for improving performance and attaining lower power consumption, a multiprocessor system (i.e., a single chip multiprocessor system) appears promising. In the multiprocessor system, a plurality of processor units (hereinafter, referred to as PU) such as conventional CPU and digital signal processor are mounted on a chip and operated in parallel to thereby obtain high arithmetic operation performance without increasing an operation frequency processes in parallel. In the future, it is expected that a further progress in miniaturization will enable 100 to 1000 PUs to be mounted on a chip.

In such a multiprocessor system, to obtain arithmetic operation performance proportional to the number of PUs, the mounted PUs must be simultaneously operated to process programs. However, descriptions of program manipulation are generally made in time sequence, which hinders to attain the arithmetic operation performance expected to be in proportion to the number of PUs, despite the plurality of mounted PUs.

In order to solve the above-mentioned problem, there is a method in which a program developer himself rewrites original programs by adding parallelization codes to the programs, with consideration given to parallelism of the programs for executing the programs on the plurality of PUs, based on the configuration of the multiprocessor system in which the programs are to be executed. This method is useful for a system which includes only a few PUs, however, this method is not practical in a case of a future system which has several tens to several thousands of PUs mounted therein, especially when the PUs are of different types, in terms of development time or effective performance.

Accordingly, studies have already been made on an automatic parallelization compiler, for use in a multiprocessor system constituted of a plurality of PUs similar in configuration and arithmetic operation performance, which analyzes input programs, extracts parallely operable parts from the programs, and allocates these parts to a plurality of PUs for simultaneous execution. For example, JP 2004-252728 A discloses a compilation system in which an input source program is analyzed for dividing the program into blocks (i.e., tasks) of various grain sizes such as subroutines or loops to analyze parallelism among the plurality of tasks, and the tasks and data to be accessed by the tasks are divided into sizes suited to a cache or local memory, to optimally allocate the tasks to the PUs to thereby generate an object program for efficiently operating the multiprocessor system. An architecture of a chip multiprocessor for supporting the multigrain parallel processing function is disclosed in JP 2001-175619 A.

In the multiprocessor system, a reduction of power consumption in each PU is essential to reduce power consumption and exhaust heat. Various proposals have been made regarding methods for reducing power of the individual processors. For example, a method for reducing power by dynamically controlling a frequency/voltage, i.e., reducing a system clock of a processor within real-time processing restrictions and supplying a voltage according to the system frequency to the processor is disclosed in JP 3138737 B and JP 2004-2341126 A.

In addition, according to a method disclosed in JP 2004-252900 A, a plurality of different kinds of processors such as CPU or digital signal processor are combined according to characteristics of each processing, whose processing time and power consumption on the processors are measured and provided as information beforehand, thereby dynamically allocating a series of processes to the processors based on the information.

DISCLOSURE OF THE INVENTION

Currently, new applications are being generated for use in an automobile navigation system, a portable telephone, a digital television, or the like for simultaneously treating variety of data such as an image, voice, and database information. Under the circumstances, it is expected that the processor will have plural types of PUs mounted thereon to simultaneously process various kinds of input data by the method optimal for each kind of data. As disclosed in JP 2004-252728 A, a conventional multiprocessor system is a homogeneous processor system which includes a plurality of similarly configured PUs mounted thereon.

However, in a future heterogeneous multiprocessor system for simultaneously processing various applications on a variety of PUs, there is a problem that processing efficiency in proportion to the types and the number of PUs to be mounted cannot be attained unless programs are paralleled and arranged with consideration given to the types of PUs.

Up to now, for efficient execution of programs on the plurality of PUs, in a case where a small program or a processing sequence can always be executed in a fixed manner, it is necessary that the program first be executed in the system to measure processing time and the like, and that the developer manually generate the schedule information based on the measured value in order to obtain schedule information such as execution time for scheduling which consumes a large amount of labor and time.

In this case, in a case of a general program whose processing contents or sequence cannot be confirmed beforehand, or in a case of a program especially large, it is difficult to manually generate the information beforehand. Similarly in a case where the types or the number of PUs increase, it is also difficult to manually generate the information.

In the system including many PUs mounted thereon, there is a fear that power consumption of the entire processor will increase. Accordingly, in applying the system especially to a mobile device such as a portable telephone or a digital television used at home, power supply management or system frequency control need to be more precisely performed depending on a processing state of each PU by software in each application program in addition to the conventional frequency and voltage (i.e., system frequency and driving voltage) control by the operating system.

In particular, it is necessary to reduce power consumption without degrading processing performance. In executing a program requiring real-time processing, it is also necessary to reduce power consumption while complying with time restrictions.

It is therefore an object of this invention to provide a multiprocessor system including various types of PUs mounted thereon, and a compiler used in the system for efficiently operating the PUs by automatically extracting parallel tasks from an input program to be processed, and by arranging the tasks according to characteristics of the PUs, and further for generating codes for optimizing a system frequency, a power supply voltage, or the like by estimating a processing amount of the PUs and adding the codes to an object program, the multiprocessor system enabling optimization thereof.

Therefore, according to this invention, due to the compiler used in the multiprocessor system which integrates various processor units, the programs are divided and arranged for efficiently operating the processor units and control codes (i.e., execution codes) are generated, which minimizes processing time and makes a process to be carried out at low power while making maximum use of performance of the processor system. Moreover, a software developer can efficiently create programs within a short time without giving consideration to a configuration of the processor unit.

When the input program is compiled, the compiler estimates processing time beforehand based on the processor unit configuration, and schedules tasks whose processing order is decided beforehand at compiling stage to each processor. In case processing order cannot be determined at compiling time, the compiler generates dynamic scheduling codes which assign such tasks to processors at runtime based on processing information containing execution time. Accordingly, a general program can be efficiently processed by the multiprocessor system constituted of various processor units.

The compiler analyzes the input program, estimates processing time after task scheduling, and precisely executes power supply management and frequency control for each processor unit with giving consideration to a margin of the processing time with respect to time restrictions. Hence, power consumption can be greatly reduced.

In the multiprocessor constituted of processing units of different types, input programs are parallelized and scheduled to minimize execution time, and system frequency control and power supply management are precisely executed for each processor unit. Therefore, power consumption can be optimized without degrading performance.

BRIEF DESCRIPTION OF THE DRAWINGS

FIG. 9 is an explanatory diagram showing an operation mode of a processor unit based on frequency and voltage control.

FIG. 13 is an explanatory diagram showing an operation mode of the local memory LM based on frequency and voltage control.

FIG. 14b is an explanatory diagram showing a setting example of the frequency and voltage control register format as in the case of FIG. 14a.

FIG. 14c is an explanatory diagram showing another example of a frequency and voltage control register format in which the LM is constituted of 4 banks and addresses are allocated for control targets.

FIG. 15 is an explanatory diagram showing an example of a format of the frequency and voltage setting table shown in FIG. 8.

FIG. 17b is an explanatory diagram of an example of frequency and voltage control register access showing an object code when the CPU 0 accesses the frequency and voltage control register of the DSP 0.

FIG. 17c is an explanatory diagram of an example of frequency and voltage control register access showing an object code when the frequency and voltage control register is operated by using an application programming interface or API of an operating system.

FIG. 21 is a source code showing an example of an input program.

FIG. 24 is an explanatory diagram showing an example of codes generated by the compiler for the CPU 0, the DSP 0, a DRP 0, and DRP 1.

FIG. 25 is an explanatory diagram showing an example of codes generated by the compiler for a CPU 1, a DSP 1, a BMP 0, and a BMP 1.

BEST MODES FOR CARRYING OUT THE INVENTION

An embodiment of this invention will be described below with reference to the accompanying drawings.

<Entire Configuration of Embodiment>

Figure 1:
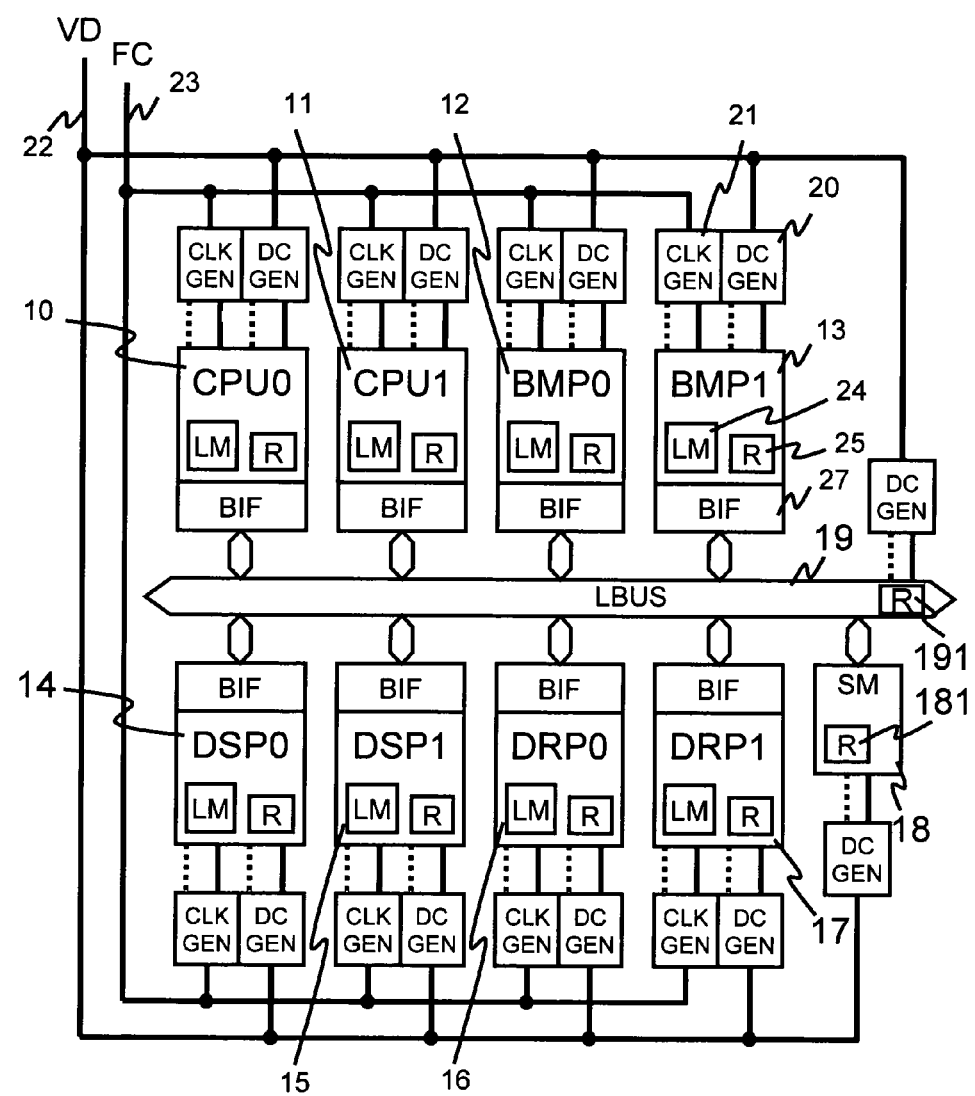
FIG. 1 is a block diagram of a multiprocessor system of a power supply/frequency generation type according to an embodiment of this invention.

FIG. 1 shows a configuration of a multiprocessor system according to an embodiment of this invention. In FIG. 1, the multiprocessor system mainly includes a plurality of different types of processor units (hereinafter, referred to as PU) 10 to 17, and a shared memory (hereinafter, referred to as SM) 18 there among. The PUs 10 to 17 are connected to a local bus (referred to as LBUS) 19 through bus interfaces (BIF) 27, respectively. The SM 18 is connected to the LBUS 19 to be accessed from the PUs 10 to 17. A power supply voltage generation circuit (DCGEN) 20 and a clock generation circuit (CLKGEN) 21 are connected to the PUs 10 to 17 to supply a power supply voltage and a system clock thereto. This multiprocessor system is a heterogeneous multiprocessor system constituted of different types of processor units.

This embodiment shows an example in which types and numbers of PUs are constituted of two general-purpose processors (hereinafter, referred to as CPU) 10 and 11, two digital signal processors (hereinafter, referred to as DSP) 14 and 15, two dynamically reconfigurable processors (hereinafter, referred to as DRP) 16 and 17, and two bit manipulation processor (hereinafter, referred to as BMP) 12 and 13. The types and the numbers of PUs are not limited to those shown in this embodiment, but various configurations can be employed. A conventional configuration of only the same type of PU (e.g., constituted of four CPUs only) may be employed. According to this embodiment, the DSPs (0 and 1) 14 and 15, the DRPs (0 and 1) 16 and 17, and the BMPs (0 and 1) 12 and 13 are accelerator units, while the CPUs (0 and 1) 10 and 11 are general-purpose processor unit.

The DRPs (Dynamically Reconfigurable Processors) 16 and 17 are processors which can dynamically reconfigure a processing circuit configuration and therefore a processing function, so that specific processing determined by the configuration can be executed in a more highly efficient manner than CPUs.

Each of the PUs 10 to 17 includes a local memory (or cache) (LM) 24 for temporarily storing a program or data to be processed by the PU, and a system control register (R) 25 for executing frequency/power supply voltage (FV) control to decide a supply voltage (VL) and a system frequency (FL) to be supplied to the PU and synchronous control among the PUs. The local memory (LM) 24 is divided into an area in which a global address to be accessed from the other PU and the original PU having the LM is mapped, and an area in which a private address to be accessed from the original PU only is mapped. The shared memory (SM) 18 connected to the LBUS 19 has a global address mapped therein, and can be accessed from the plurality of PUs. The application configuration of this invention is only an example, and this embodiment is in no way limitative. For example, though not shown in FIG. 1, peripheral circuits such as input/output processing, interruption processing, a timer, and a debug circuit are to be connected to the LBUS 19 when necessary. Similar or different types of buses may be connected in a tiered manner though a bus bridge.

The SM 18 shared by the PUs 10 to 17 includes a system control register (R) 181 for setting a supply voltage (VL) and a system frequency (FL) to be supplied to the SM 18 to execute frequency and voltage (FV) control. The local bus LBUS 19 for interconnecting the PU and the SM includes a system control register R 191 for setting VL and FL to be supplied to the LBUS 19 to execute frequency and voltage control. In place of this system control register (R) 181, a frequency and voltage control register of the SM 18 and the LBUS 19 may be disposed in each of the system control registers (R) 25 of the PUs 10 to 17. The system control register (R) 181 is set by one of the PUs 10 to 17.

The PUs 10 to 17 are configured on one chip (LSI). However, a plurality of LSIs constituting PUs 10 to 17 may be connected to configure one chip or module.

The SM 18 may be shared by each processor type (CPU, DSP, DRP, or BMP). For example, as described below with reference to FIGS. 10a to 10c, an area of the SM 18 is divided into banks, and each bank can be shared by each processor type. Alternatively, a part of the SM 18 may be shared by the plurality of PUs.

<Voltage/Frequency Variable Circuit>

Next, configurations of the power supply voltage generation circuit (DCGEN) 20 and the clock generation circuit (CLKGEN) 21 connected to each PU will be described.

Figure 2:
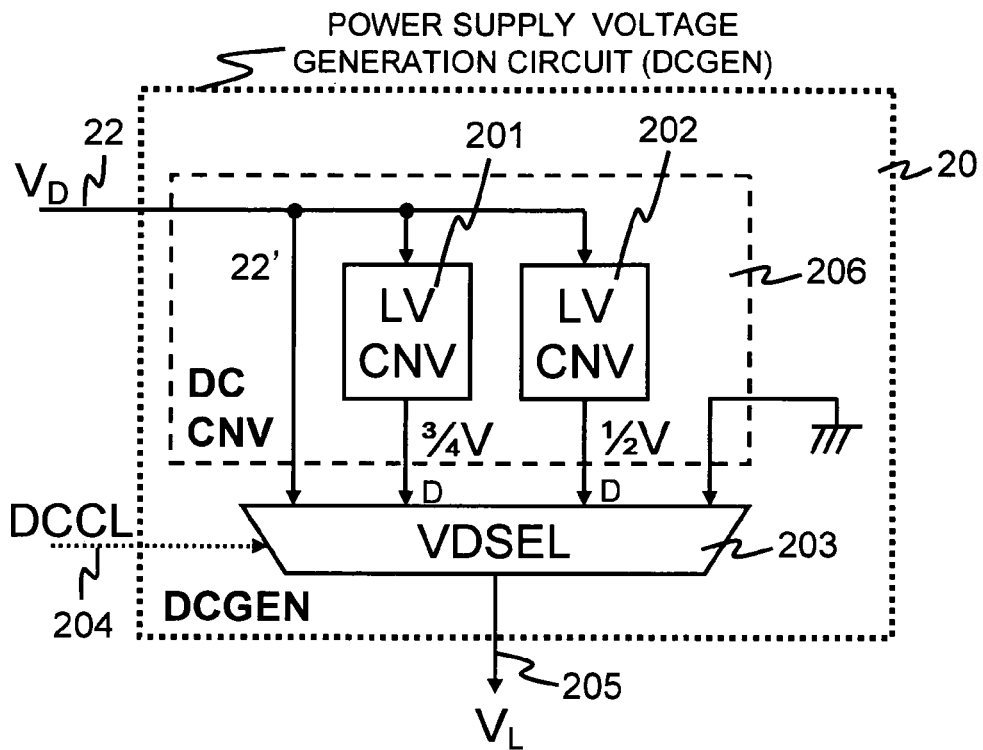
FIG. 2 is a block diagram of a power supply/voltage generation circuit.

FIG. 2 shows the configuration of the DCGEN 20. The DCGEN 20 includes a circuit (DCCNV) 206 for stepping down a normal power supply voltage (VD) 22 supplied from the outside to a plurality of supply voltages (VL) 205 designated beforehand, a supply voltage selection circuit (VDSEL) 203 for selecting a voltage to be supplied to the PU from the plurality of generated supply voltages, and a circuit (described below) for cutting off a power supply voltage.

The step-down (or boosting) circuit (DCCNV) 206 includes a plurality of voltage step-down units. For example, as shown in FIG. 2, it includes a circuit 22' for directly supplying a power supply voltage VD, a step-down circuit (LVCNV) 201 for stepping down the power supply voltage to ¾, and a step-down circuit (LVCNV) 202 for stepping-down the power supply voltage VD to ½.

For the PUs 10 to 17, the supply voltage selection circuit (VDSEL) 203 is controlled via a control line (DCCL) 204 by a FV (driving frequency and driving voltage) mode set in the frequency and voltage control register in the system control register (R) 25 of each PU to select one of a plurality of voltages generated by the step-down circuit (DCCNV) 206, and the selected supply voltage VL is supplied to corresponding one of the PUs 10 to 17. The frequency and voltage control register is to be set in a predetermined area in the system control register 25.

Figure 3:
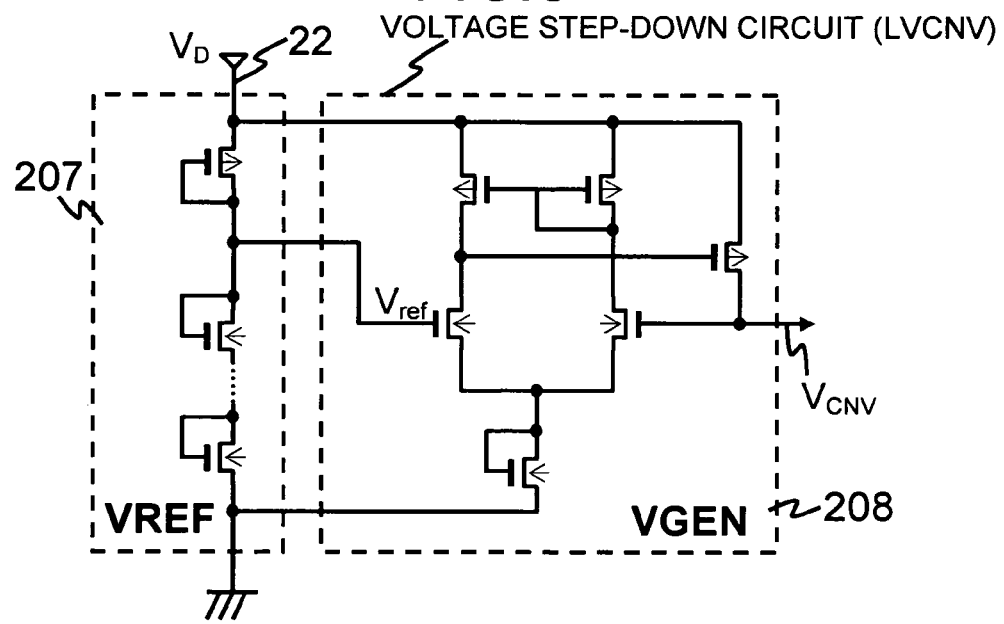
FIG. 3 is a block diagram of a voltage step-down circuit.

FIG. 3 shows the configuration of the circuit (LVCNV) for stepping down a power supply voltage. The step-down circuits LVCNV 201 and 202 of FIG. 2 include a reference voltage generation circuit (VREF) 207 for deciding a supply voltage (¾ VD), and a power supply generation circuit (VGEN) 208 for stepping-down a voltage to a voltage designated by a reference voltage and supplying a current to the PU, and an output of the power supply generation circuit 208 is input to the supply voltage selection circuit 203 of FIG. 2.

An output voltage (VCNV) of the step-down circuit LVCNV is decided by the number of stages of an nMOSFET in the reference voltage generation circuit (VREF) 207 for deciding a reference voltage, and a configuration of the LVCNV is decided to supply a voltage designated by the frequency and voltage control register. A voltage designated via the control line 204 from the PU is selected from a plurality of voltages stepped down by the above-mentioned circuit to be output to each of the PUs 10 to 17 (205).

Figure 4:
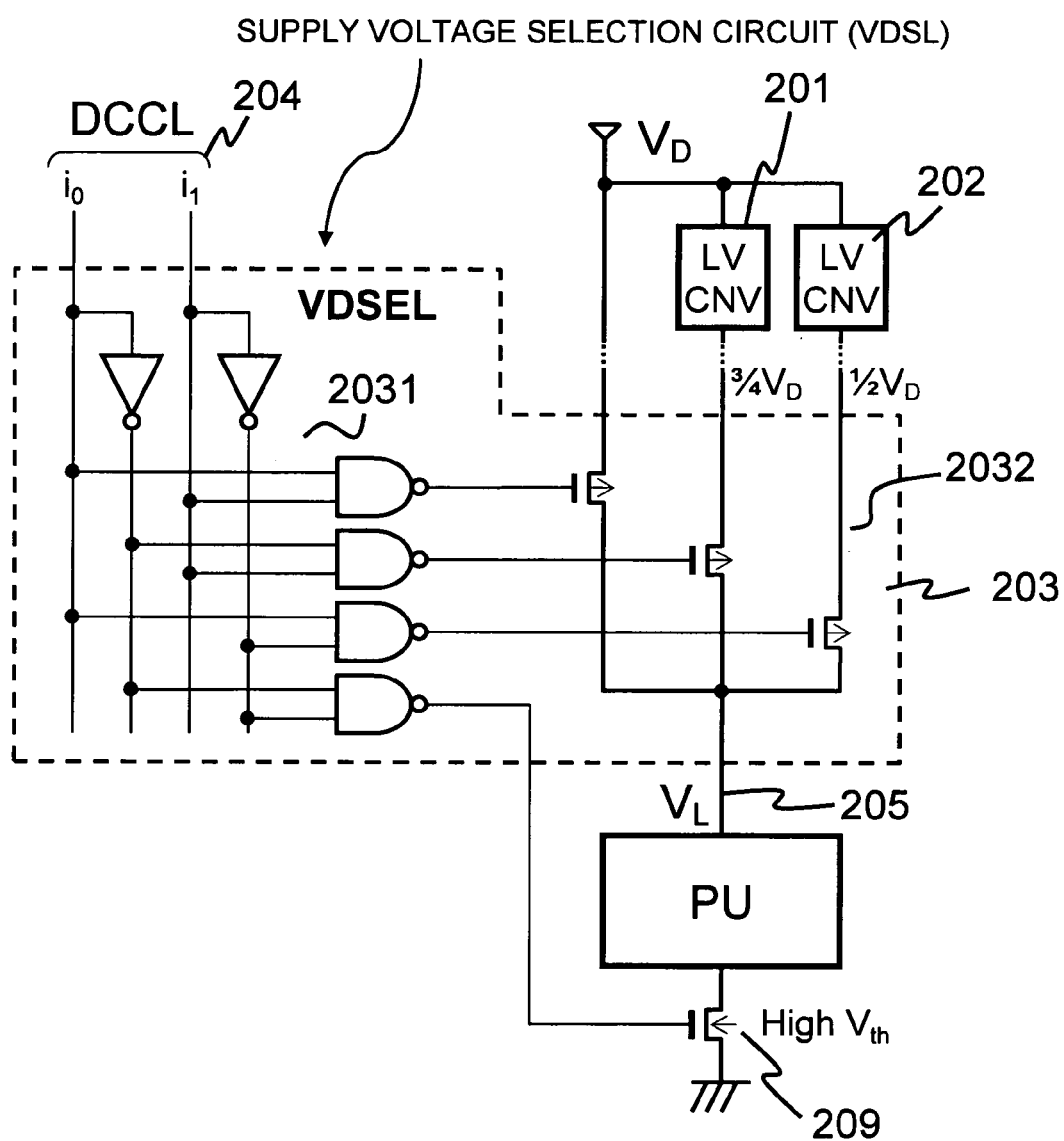
FIG. 4 is a block diagram of a supply voltage selection circuit.

FIG. 4 shows an example of a configuration of the supply voltage selection circuit (VDSEL) 203. The supply voltage selection circuit (VDSEL) 203 includes a control signal decoding unit 2031 and a voltage selection switch 2032.

By inserting an nMOSFET 209 of a high threshold value into the source voltage supply unit of the PU, a leakage current flowing during the power cutoff of the PU can be reduced. Each of the configurations of FIGS. 3 and 4 is only one configuration for realizing a function of the step-down circuit LVCNV, and other various power supply voltage generation circuit may be applied.

Figure 5:
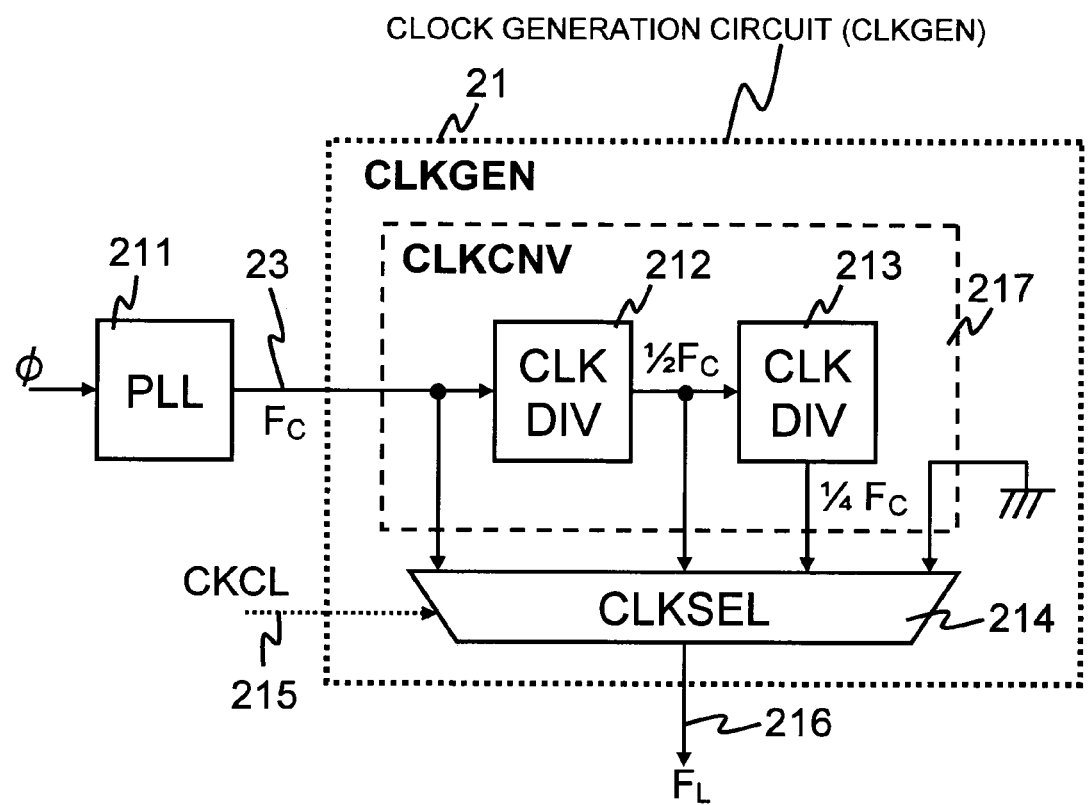
FIG. 5 is a block diagram of a clock generation circuit.

Next, referring to FIG. 5, an example of a configuration of the clock generation circuit (CLKGEN) 21 will be described. The CLKGEN 21 includes frequency division circuits 212 and 213 for reducing an internal clock FC (23) to an integral submultiple, such as ½ or ¼ of the internal clock, and a clock pulse selector (CLKSEL) 214 for selecting a clock (FL) 216 to be supplied to the PU from a plurality of frequency-divided clocks. The internal clock FC (23) is generated by multiplying a system clock input from the outside by a designated multiplication rate at a phase locked loop (PLL) circuit 211.

Figure 6:
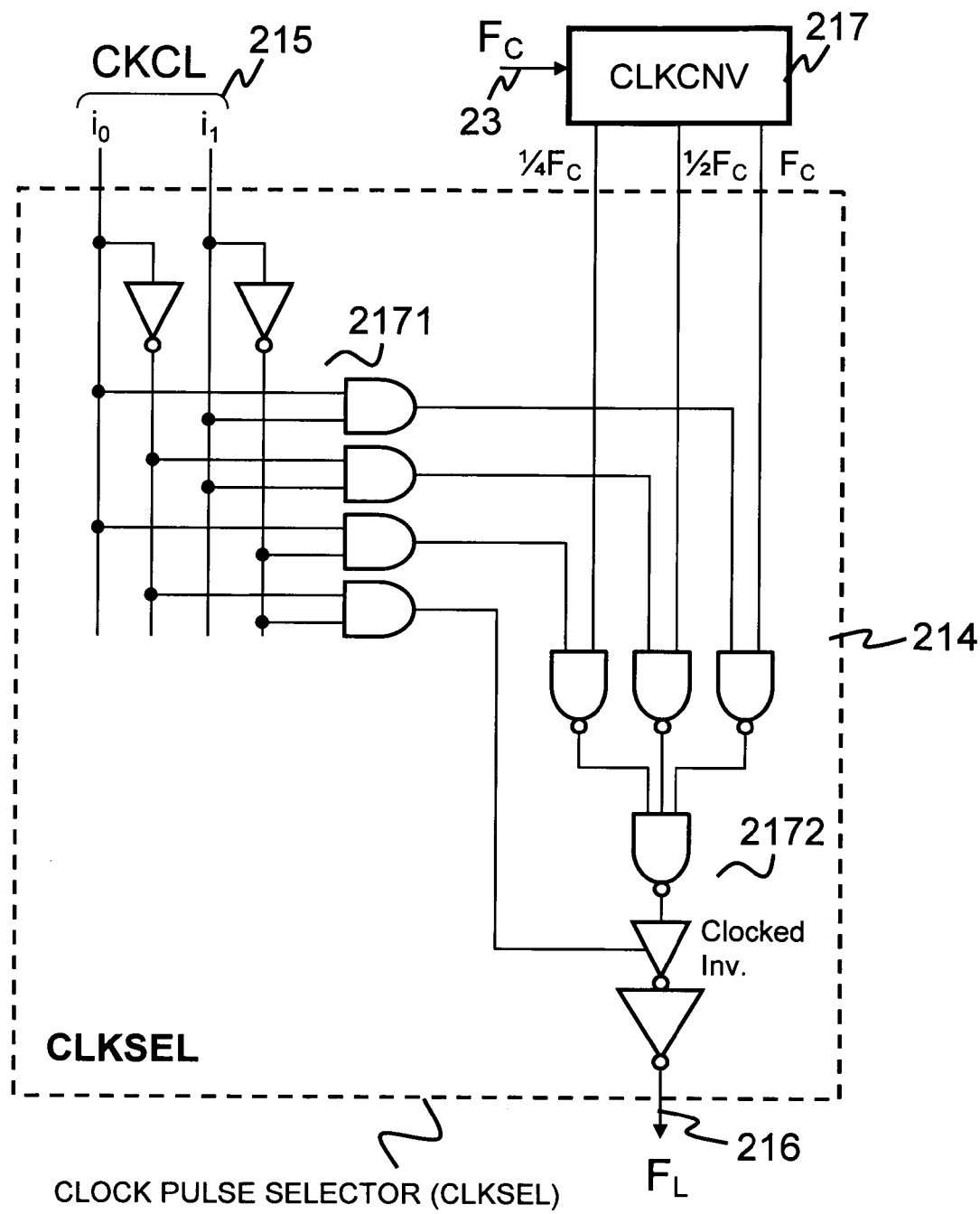
FIG. 6 is a block diagram of a clock pulse selector.

FIG. 6 shows an example of a configuration of the clock pulse selector (CLKSEL) 214. The CLKSEL 214 includes a decoding unit 2171 of an input control signal CKCL and a clock signal selection unit 2172. For each PU, an FL designated from a plurality of generated clocks is selected by controlling the DCSEL 214 via a control line (CKCL) 215 by the frequency and voltage control register mode of the PU, and the clock FL 216 is supplied.

Figure 7:
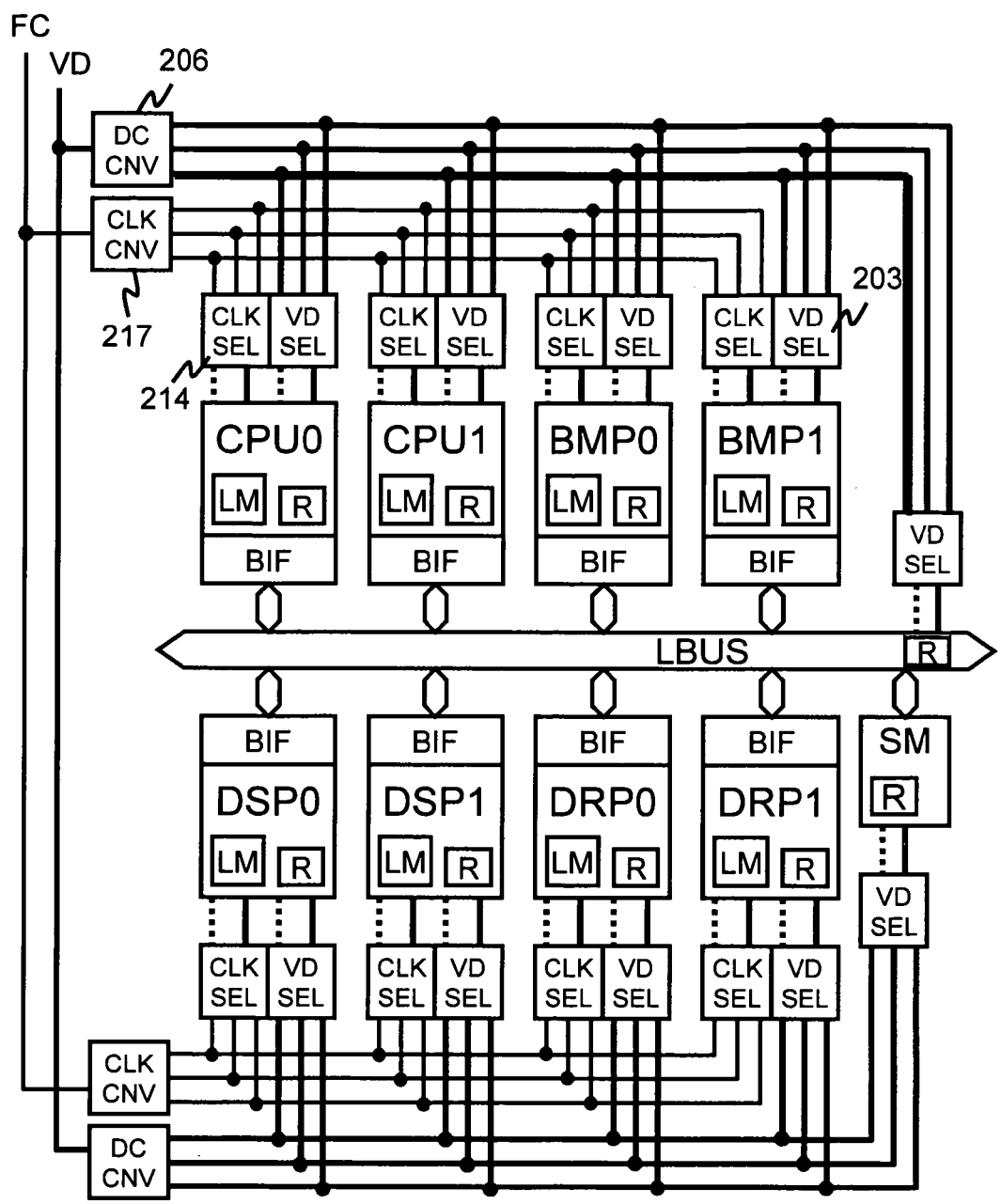
FIG. 7 is a block diagram of a multiprocessor system of a power supply/frequency selection type, which is another example of the multiprocessor system, in which a power supply/voltage generation circuit and a clock generation circuit are integrated.

In addition to the configuration of FIG. 1, as shown in FIG. 7, a configuration may be employed in which each circuit (DCCNV 206 and CLKCV 217) for converting power supply voltages and clock pulses is added to the plurality of PUs (or entire PU), and circuits (VDSEL 203 and CLKSEL 214) for selecting plural types of power supply voltages and clock pulses generated on the PU sides are added. The example of FIG. 7 shows a case in which two sets of power supply voltage generation circuits 206 and clock generation circuits 217 supply power and clocks to four PUs.

Accordingly, the circuits for generating power supply voltages and clock pulses can employ various configurations, and the configurations are not limited to the above. For example, a configuration can be employed in which one circuit DCCNV 206 for converting a power supply voltage is added to the plurality of PUs (or entire PU), and a circuit CLKCNV 217 for generating a clock pulse is added to the PU side for each PU. Alternatively, for example, a configuration can be employed in which one circuit CLKCNV 217 for generating a clock pulse is added to the plurality of PUs (or entire PU), and a circuit DCCNV 206 for converting a power supply voltage is added to the PU side for each PU. Alternatively, for example, a configuration may be employed in which a DCCNV 206 is not mounted in the chip, plural types of power supply voltages generated outside the chip are input, and a desired supply voltage VL 205 is selected and supplied by the VDSEL.

Figure 8:
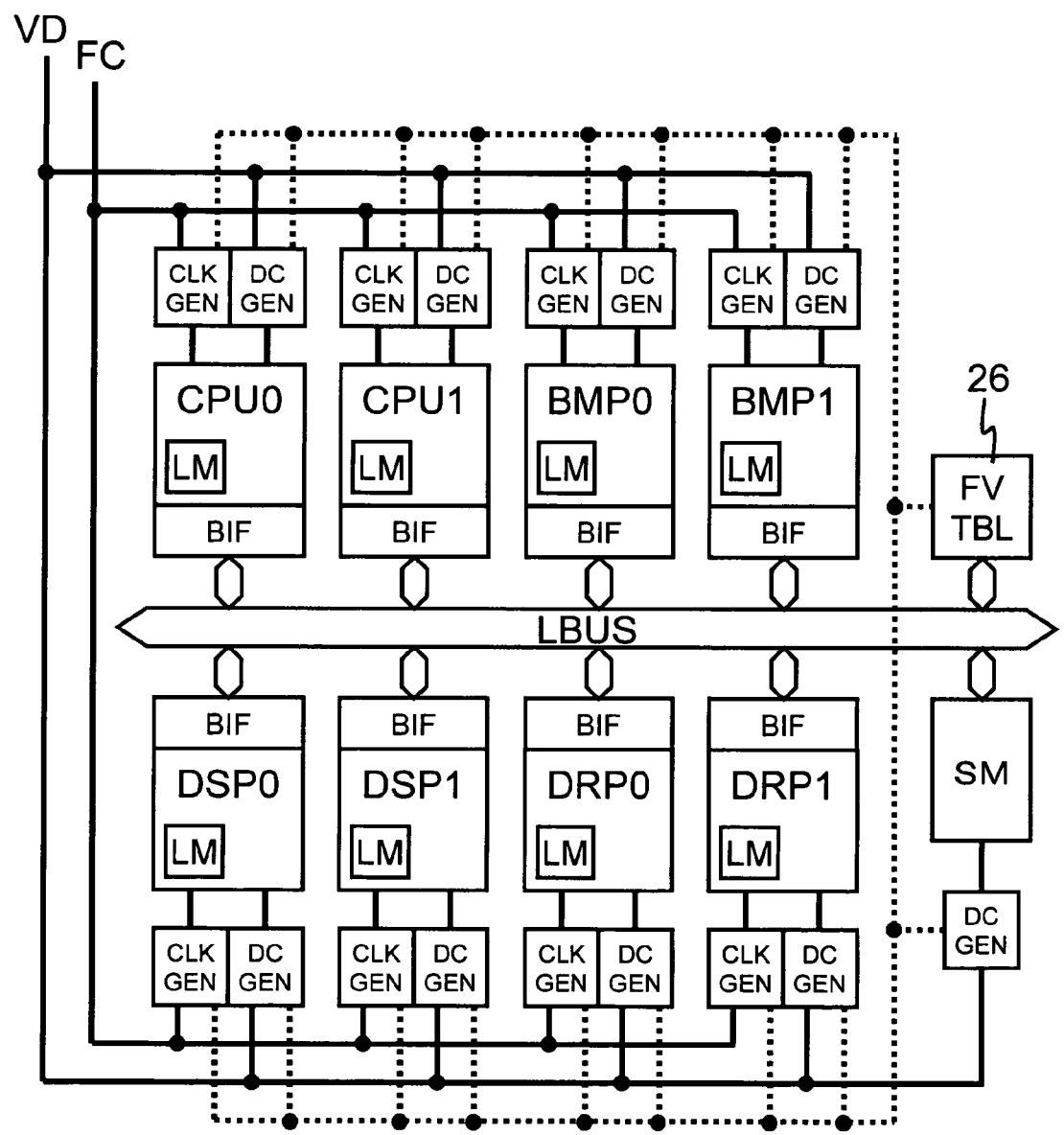
FIG. 8 is a block diagram of a multiprocessor system having a frequency and voltage control table in which frequency and voltage control registers of processor units is integrated, which is another example of the multiprocessor system.

As means for setting the frequency and voltage control mode, in addition to the configuration of FIG. 1 or 7 in which each PU has the frequency and voltage control register (system control register (R) 25) for executing frequency and voltage control of the PU, a configuration may be employed in which a frequency and voltage control table (FVTBL) 26 for holding the frequency and voltage control modes of the PUs 10 to 17 in block is connected to the LBUS 19 as shown in FIG. 8. In FIG. 8, the frequency and voltage control register included in the system control register 25 of FIG. 1 is integrated as the frequency and voltage control table 26 connected to the local bus LBUS 19.

The frequency and voltage control table (FVTBL) 26 can be accessed from each of the PUs 10 to 17, and may be set in a part of the shared memory SM or constituted of a memory (or register) independent from the shared memory SM.

<Bus IF>

As described above, since the power supply voltages can be individually set for the PUs 10 to 17, a signal voltage level varies between the PUs and the LBUS 19 connected to the PUs. Accordingly, the bus interface (BIF) 27 connected between the PUs 10 to 17 and the LBUS 19 includes a signal level conversion circuit (not shown) to convert a signal level between the bus LBUS 19 and the PUs 10 to 17.

<Setting of Voltage/Frequency Mode for PU>

Next, a hardware mechanism for deciding a power supply voltage (VL) 205 and a system clock (FL) 216 generated by the power supply voltage generation circuit (DCGEN) 20 and the clock generation circuit (CLKGEN) 21 will be described.

Operation modes (VL and FL values to be supplied) of the power supply voltage generation circuit DCGNE 20 and the clock generation circuit CLKGEN 21 are decided beforehand during designing, and each PU designates the circuit via a control line DCCL or CKCL based on a value of the frequency and voltage control register of the PU. A setting method of VL and FL will be described below in detail. The compiler generates a control code for setting a frequency and voltage control register, and the general-purpose processor CPU 0 or the CPU 1 for executing the code accesses the memory-mapped frequency and voltage control register to rewrite the value.

According to this embodiment, the FV mode of the PUs 10 to 17 is set by four stages of VL and FL combinations (2 bits in frequency and voltage control register). FIG. 9 shows an operation mode list of the PUs 10 to 17. An OFF mode voltage/frequency cutoff of VL=0 and FL=0 is set when a value of 2 bits of the frequency and voltage control register is "00", and a FULL mode equal to a power supply voltage at VL=VD and equal to a system frequency at FL=FC is set when a value of the register is "11".

A LOW mode of VL=(½) VD and FL=(¼) FC is set when a register value is "01". A MIDDLE mode of VL=(¾) VD and FL=(½) F is set when a register value is "10". The number of VL/FL modes and a VL value/FL value are decided based on a form or an application of a system to be built, a process technology to be used, or the like.

<Partial Frequency and Voltage Control in PU>

It has been described the case where all the PUs are targeted for the frequency and voltage control, and the frequency and voltage control mode is set for the PUs altogether. However, different frequency and voltage control modes may be set for the local memories (LM) and the frequency and voltage control registers to be mounted in the PUs 10 to 17, and other peripheral circuits to the processor. This can be realized by expanding the bit fields of the frequency and voltage control registers and providing fields to set frequency and voltage control modes corresponding to parts to be subjected to frequency and voltage control. For example, a mechanism of independently setting FL and VL may be employed for circuits such as a local memory LM and a system control register (R) 25 whose data must be held. In other words, by executing frequency and voltage control for the local memory LM and the frequency and voltage control register independently, the data of the LM and the R are held even when the FV of the PU is cut off, and the LM of the PU can be accessed from another PU even when the target PU is cut off.

A plurality of frequency and voltage control targets can be set due to the configuration of the local memory LM. Each of FIGS. 10*a* to 10*c* shows a frequency and voltage control system for the local memory LM.

Figure 10A:
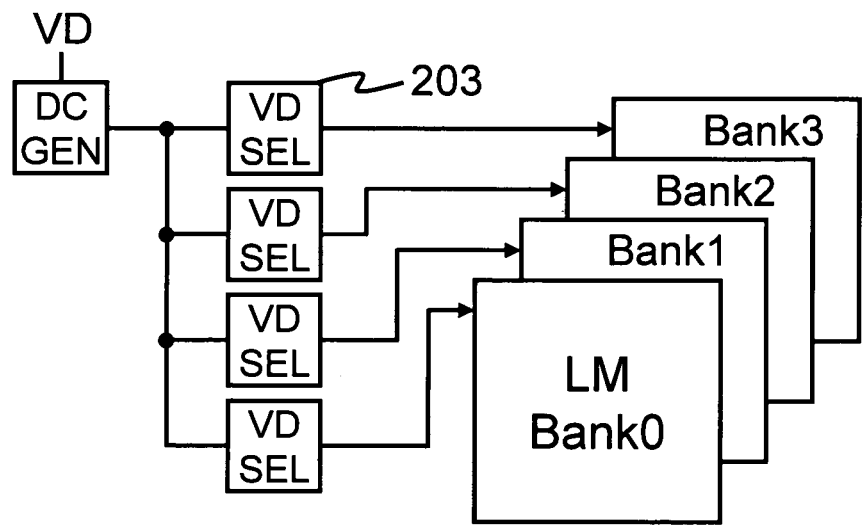
FIG. 10a is an explanatory diagram showing an example of frequency and voltage control of a local memory executed for each bank where the local memory LM is constituted of a plurality of banks.

For example, as shown in FIG. 10*a*, a bank configuration is employed for the local memory LM, and frequency and voltage control is carried out for each bank (i.e., banks 0 to 3). Accordingly, a supply voltage selection circuit (VDSEL) 203 is connected to each of the banks 0 to 3.

In other words, a normal voltage or a minimum voltage necessary for holding data is supplied to a bank whose data must be held while power supplies to the banks other than the bank are cut off to thereby save the power. At the same time, since it is not necessary to save data, return from the PU power cut-off time to the normal operation time can be made at a high speed.

Figure 10B:
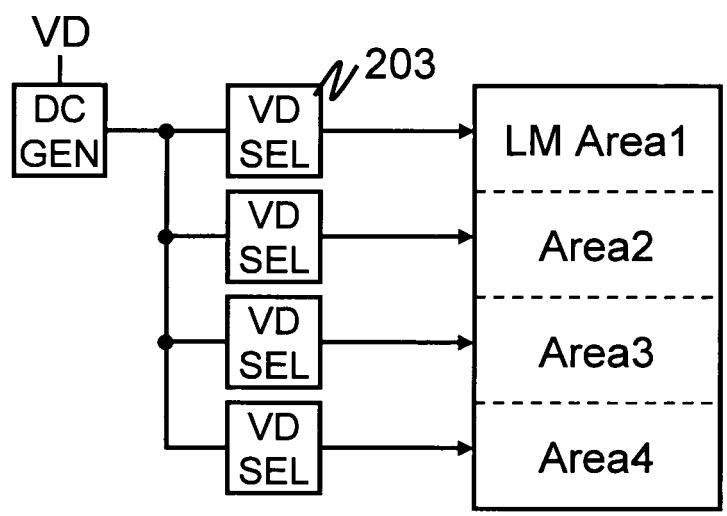
FIG. 10b is an explanatory diagram showing an example of frequency and voltage control of the local memory executed for each of a plurality of address spaces of the local memory LM.
Figure 10C:
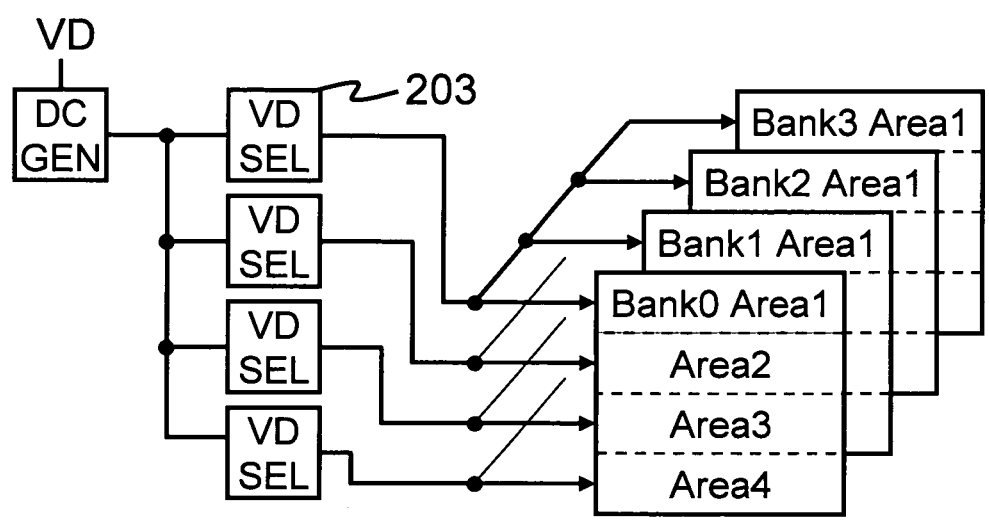
FIG. 10c is an explanatory diagram showing an example of a frequency and voltage control of the local memory executed for each of address spaces set in a plurality of banks.

As shown in FIG. 10*b*, the address space of the local memory LM is divided into certain continuous address spaces (i.e., areas 1 to 4) and frequency and voltage control is carried out by the space units. Accordingly, power consumption can be reduced by cutting off power supplies to unnecessary address spaces (i.e., storage areas).

Therefore, the supply voltage selection circuit (VDSEL) 203 is connected for each of the address spaces (i.e., areas 1 to 4) of the local memory LM.

As shown in FIG. 10*c*, in the case of the bank configuration of the local memory LM, frequency and voltage control is carried out for each unit of the local memory LM divided by certain continuous address spaces (i.e., areas 1 to 4) across the banks (i.e., banks 0 to 3).

Accordingly, the supply voltage selection circuit (VDSEL) 203 is connected for each of the address spaces (i.e., areas 1 to 4) over the banks 0 to 3 of the local memory LM. With this configuration, low power consumption can be realized while utilizing the bank configuration to realize memory interleaving for achieving a high speed of memory access.

The local memory LM may be divided into a part to be accessed from the PU alone having the LM functionally mounted thereon (i.e., unshared memory) and a part to be accessed from not only the PU but the other PUs (i.e., distributed shared memory) to be mounted, and frequency and voltage control may be carried out for each of the above two memory function units. Accordingly, though not shown, the supply voltage selection circuit (VDSEL) is connected for each of the unshared memory and the distributed shared memory areas.

The memory division methods shown in FIGS. 10*a* to 10*c* can similarly be applied for various memories or functional part units such as the memory function units and the shared memory SM mounted in the system. For example, a configuration of a plurality of banks may be employed for the shared memory SM arranged outside of the PU, and frequency and voltage control may be separately carried out corresponding to access frequencies to the banks and a system state (e.g., standby or sleep state).

For example, the configuration of FIG. 10*a* is applied to the shared memory SM 18 in place of the local memory LM, in which the shared memory SM 18 is divided into banks (i.e., banks 0 to 3) and the supply voltage selection circuit (VDSEL) 203 is connected to each bank, to thereby execute power control for each bank units. Alternatively, the configuration of FIG. 10*b* is applied to the shared memory SM 18 in place of the local memory LM, in which the address space of the shared memory SM 18 is divided into certain continuous address spaces (i.e., areas 1 to 4) and frequency and voltage control is executed for each space units to cut off power supplied to the unnecessary address spaces, to thereby reduce power consumption. Also, the configuration of FIG. 10*c* is applied to the shared memory SM 18 in place of the local memory LM, in which frequency and voltage control (i.e., power control) can be carried for each unit of the shared memory SM 18 divided by certain continuous address spaces (areas 1 to 4) across the banks (i.e., bank 0 to 3). It should be noted that the structure shown in FIGS. 10*a* to 10*c* are applied to the shared memory SM 18, "LM" shown shall be interpreted as "SM".

<Frequency and Voltage Control Mode for Local Memory LM>

As an example where frequency and voltage control targets are a plurality of parts (i.e., functional parts) in the PU, a method of executing frequency and voltage control for the local memory LM independently of the PU will be described below. According to the example, the local memory LM is constituted of four banks (i.e., banks 0 to 3) as shown in FIG. 10*a*, and the PU and each LM bank are targeted for frequency and voltage control.

A frequency and voltage control mode of the PU is as shown in FIG. 9. FIG. 13 shows a list of frequency and voltage control modes of the local memory LM. As a memory is targeted for the operation mode of LM, according to this embodiment, three operation modes provided as the operation modes of LM, i.e., a normal operation mode (in which VL=VD, FL=FC, and register value is "11") capable of normal memory accessing and data holding, a data holding mode (in which VL=½ VD, FL=0, and register value is "01") inhibited from accessing the memory but permitted to hold data, and a power supply cutoff mode (in which VL=0, FL=0, and register value is "00") for completely cutting off power without holding data.

Figure 14A:
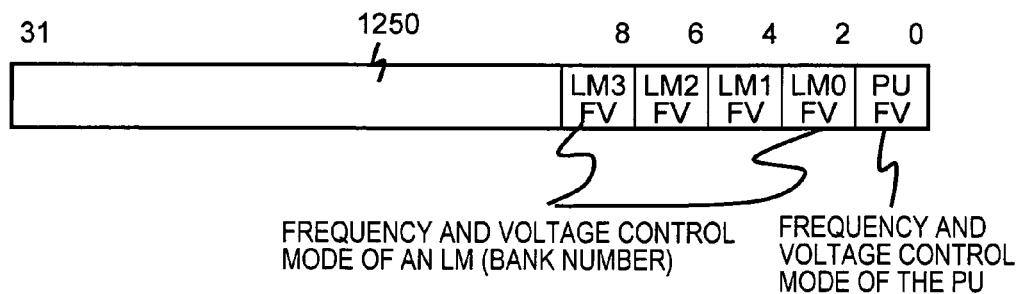
FIG. 14a is an explanatory diagram showing a frequency and voltage control register format when the local memory LM is constituted of 4 banks.

FIG. 14a shows a format of a frequency and voltage control register corresponding to frequency and voltage control of each bank, where the local memory LM is constituted of a plurality of banks as shown in FIG. 10a or 10c. According to the example, for each of the PUs 10 to 17, a frequency and voltage control register 1250 is mapped in one memory address, and a frequency and voltage control mode is decided for each control target in its field (i.e., mapped address). When one field includes 32 bits as shown in the drawing, i.e. with bits 1 and 0 set for a frequency and voltage control mode of the PU (PUFV), bits 3 and 2 set for a frequency and voltage control mode of an LM bank 0 (LM0FV), bits 5 and 4 set for a frequency and voltage control mode of an LM bank 1 (LM1FV), bits 7 and 6 set for a frequency and voltage control mode of an LM bank 2 (LM2FV), and bits 9 and 8 set for a frequency and voltage control mode of an LM bank 3 (LM3FV), a desired field is accessed, and an operation mode of the local memory LM is decided from the table of FIG. 13 to execute frequency and voltage control. It should be noted that an operation mode of the PU is decided based on the table of FIG. 9.

Figure 14B:
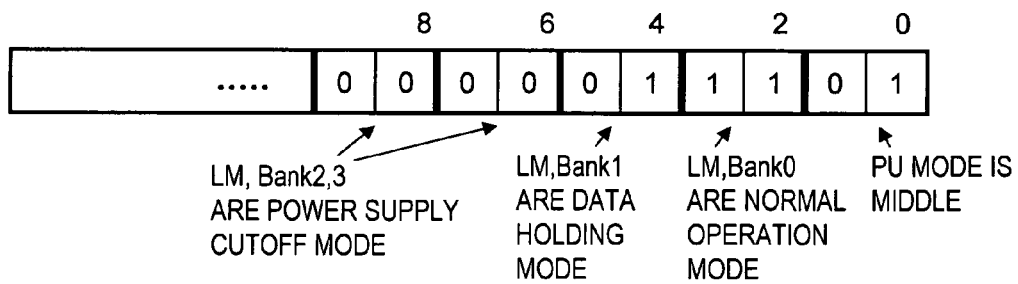

FIG. 14b shows a setting example of the frequency and voltage control register 1250. According to the example, for the PU mode, MIDDLE (i.e., "1, 0") is set in the PUFV of FIG. 14a, "1, 1" is set in the LM0FV to activate only the bank 0 of the local memory LM thereby executing a normal operation, "1, 0" is set in the LM1FV to set a data holding mode in the bank 1 of the LM, and "0, 0" is set in the LM2FV and LM2FV of the banks 2 and 3 to cut off power.

In addition, a configuration may be employed where an address is allocated to the frequency and voltage control register for each control target. For example, FIG. 14c shows a format of the frequency and voltage control register where a register is mapped in a memory address for each frequency and voltage control target. In FIG. 14c, PUFV and LM0FV to LM3FV indicating the control frequency and voltage control modes of the PU and the LM are stored in order of addresses.

As shown in FIG. 14a, when the frequency and voltage control mode of the control target is switched by a bit field of the frequency and voltage control register, bit calculation is necessary to set a value of the field. In the configuration of FIG. 14c, however, it is only necessary to directly access the address where the control target register is directly mapped, and thus the number of commands regarding frequency and voltage control register setting can be reduced. On the other hand, more address resources are necessary as compared with FIG. 14a.

Described above is the example where the frequency and voltage control modes of the PU and the LM are set by setting the frequency and voltage control register of each PU. However, as described above referring to FIG. 8, when the frequency and voltage control registers indicating the frequency and voltage control modes of the PUs 10 to 17 are provided as the frequency and voltage control tables (FVTBL) 26 connected to the local bus LBUS 19, the FVTBL is configured as shown in FIG. 15.

FIG. 15 shows a format of the frequency and voltage control table FVTBL of FIG. 8. One line of the FVTBL corresponds to a PU number (i.e., PUN 250), a frequency and voltage control mode of the PU (i.e., PUFV 251), frequency and voltage control modes of the LM (i.e., LM0FV 252, LM1FV 253, LM2FV 254, and LM3FFV 255), and a frequency and voltage control mode (i.e., BUSFV) of the local bus LBUS described below, and FV operation modes of the PU, LM and LBUS can be decided for an optional PU.

Then, the CPU 0 or the like reads the frequency and voltage control table FVTBL to decide frequency and voltage control modes of the PU, the local memory LM (for each bank), and the local bus for each of the PUs 10 to 17, and controls the voltage generation circuit (DCGEN) 20 and the clock generation circuit (CLKGEN) 21.

<Power Supply Control for Bus>

For the local bus (LBUS) 19 interconnecting the PUs 10 to 17, a power supply can be partially controlled (i.e., power supply can be cut off) as frequency and voltage control for the functional part units of the multiprocessing system.

For example, when power is cut off during non operation of one of the PUs 10 to 17, the bus interface (BIF) of the PU is not accessed. Accordingly, power of the BIF can be cut off with the result that a leakage current is reduced. When a bus configuration is a cross bar, power of the switch for deciding a bus to be connected to the PU can be controlled and cut off.

Figure 11:
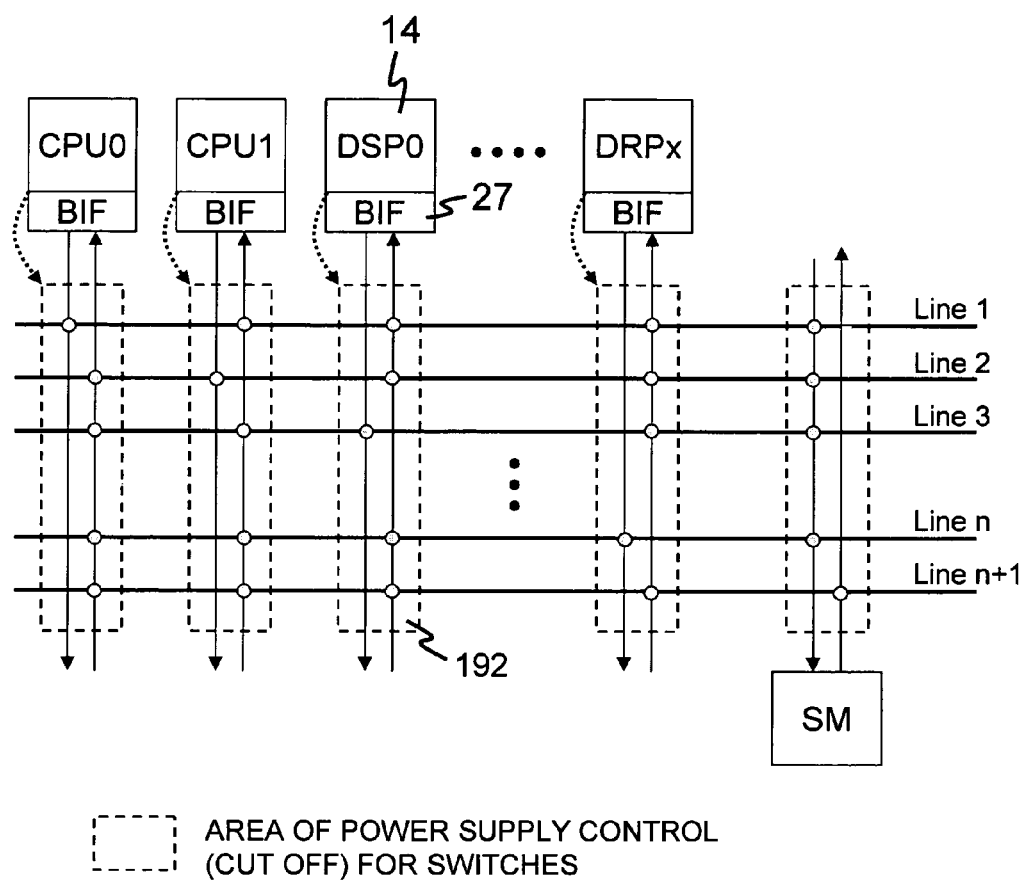
FIG. 11 is an explanatory diagram of power supply control when a local bus LBUS is constituted of a cross bar.

FIG. 11 shows a concept of the power supply control for the bus of the crossbar configuration. For example, presuming that the DSP 0 (14) is set in a power-cutoff state, and there is no communication traffic for the DSP 0, power supplies are also cut off for a BIF (27) accompanying the DSP 0, and a switch group (192) for connecting a bus network from another PU and the shared memory SM to the DSP 0.

Therefore, it is possible to reduce power consumption of the switch group 192 of the DSP 0 set in an unoperated state.

Figure 12:
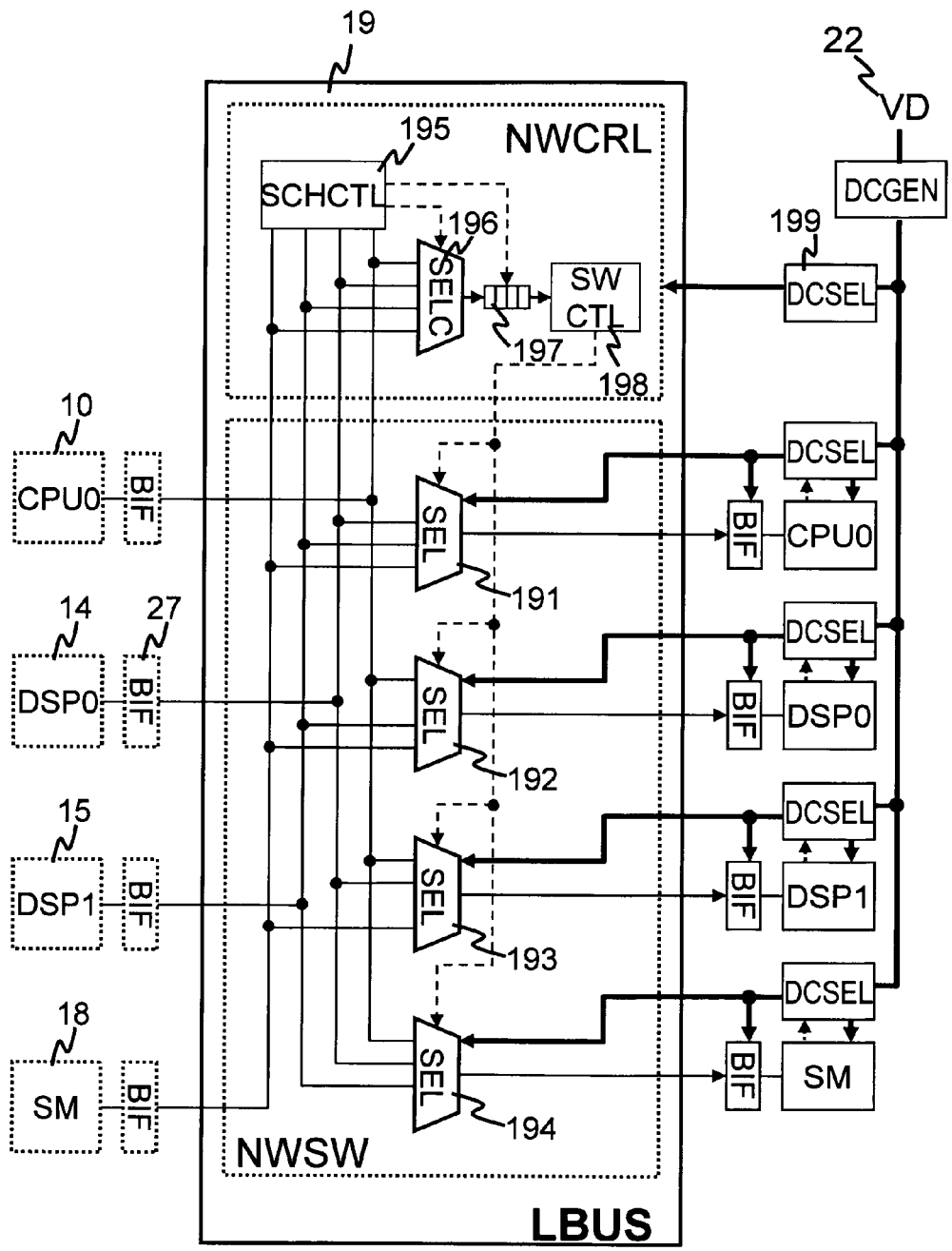
FIG. 12 is a configuration diagram of the local bus LBUS shown in FIG. 11.

FIG. 12 shows a circuit configuration for realizing power supply control for the cross-bar network. FIG. 12 shows a configuration where the CPU 0, the DSP 0, and the DSP 1 are connected to the local bus LBUS 19 constituted of the crossbar network. This circuit includes a network control unit NWCRL for analyzing packet data sent from the PUs 10 to 17 and controlling the switch group 192 shown in FIG. 11, and a network switch unit (NWSW) for connecting a sending source of the packet data to a network of a sending destination.

The network control unit NWCRL includes an SHCTL 195 for deciding priority of packet processing by analyzing the packets sent from the PUs 10 to 17, a selector (SELC) 196 that selects the packets for which priority has been decided by the SHCTL 195, a queue 197 for temporarily holding the packets, and an SWCTL 198 for controlling selector switches 191 to 194 for connecting the network of the sending destination and the sending source by analyzing the packets.

The network switch NWSW includes the selector switches (SEL) 191 to 194 for connecting the network among the PUs.

The PUs 10 to 17 and the network control unit NWCRL each include switch (DSCEL) 199 disposed to be selectively connected to the power supply generation circuit DCGEN. Power is supplied from the switches (DCSEL) 199 to the PUs 10 to 17, and to the selector switches 191 to 194 to which the PU is connected.

For example, presuming that the DSP 0 is set in a power-cutoff state and no communication traffic occurs in the DSP 0, the switch DCSEL 199 added to the DSP 0 cuts off power supply not only to the DSP 0 but also to the BIF 27 connected to the DSP 0 and the selector switch SEL1 (192) for selecting the network to the DSP. Accordingly, it is possible to further reduce power consumption by cutting off power supply not only to the DSP of the power-cutoff state but also to the peripheral circuits. When the entire network is set in a standby state, i.e., in a power-cutoff state, power supply to the NWCRL is also cut off by the switch DCSEL 199 for supplying power to the NWCRL.

<Method of Setting Frequency and Voltage Control Register>

Next, a specific method of setting the frequency and voltage control register 1250 will be described. The description will be made by configuring the register format as shown in FIG. 14a.

A global address to be uniquely accessed from all the PUs is allocated to the frequency and voltage control register of each PU. A task management PU (i.e., PU for an executing scheduler or an operating system) predetermined by the compiler accesses the address, and sets a frequency and voltage control mode by changing a value of the register.

Figure 16:
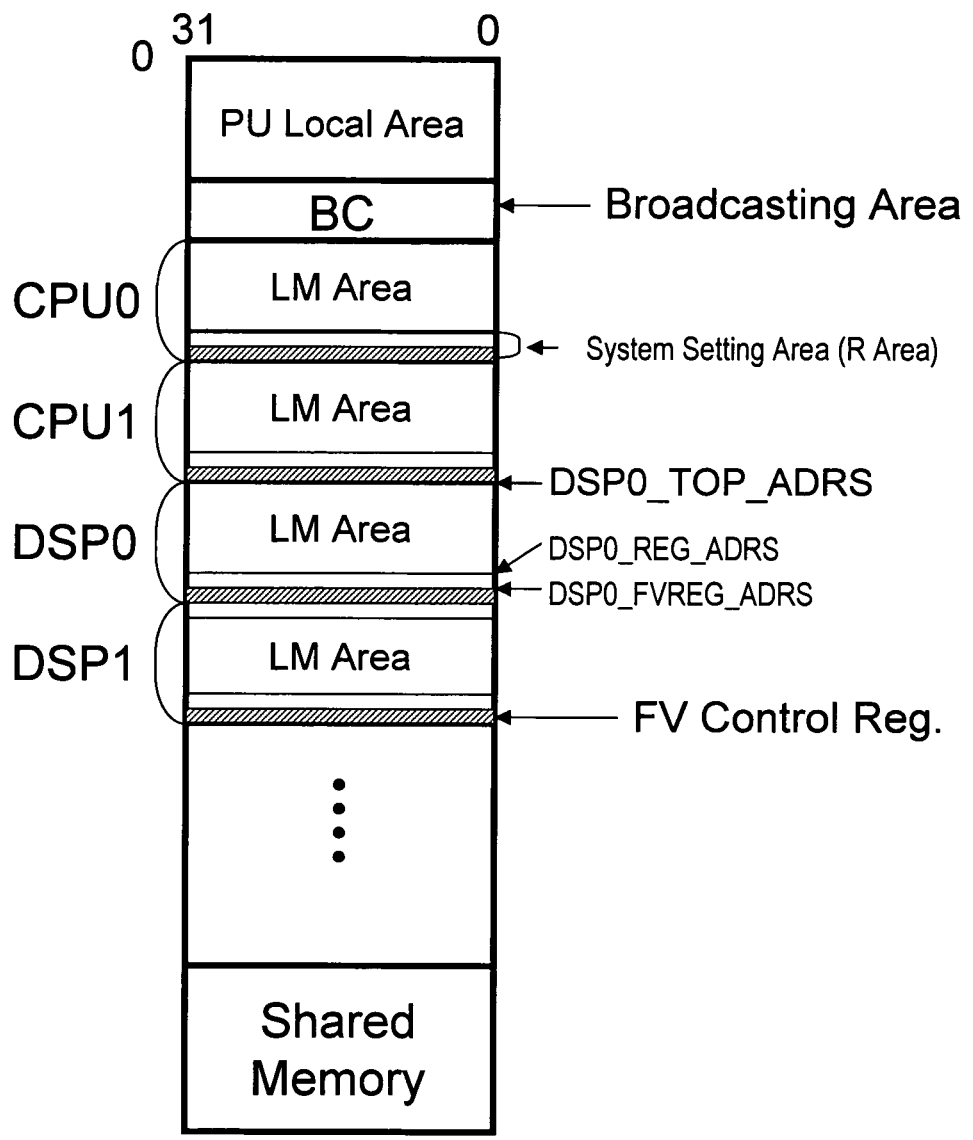
FIG. 16 is an explanatory diagram of a memory map of the entire multiprocessor system showing mapping of the frequency and voltage control register.

FIG. 16 shows a global address space map of the entire multiprocessing system. According to this embodiment, an area where PUs own local resources (system setting register including the LM, and the frequency and voltage control register 1250) are viewed, and a broadcast (BC) area are defined from a head address to a predetermined address. The BC area will be described later. An address space is allocated for each PU after the BC area, and a local memory LM address and a system setting register address is allocated to the address space in each PU. The frequency and voltage control register has one of the system setting register addresses to access, to thereby set a frequency and voltage control mode can be set by accessing the address. In FIG. 16, addresses are mapped from the head space in order of the CPU 0, the CPU 1, the DSP 0, and the DSP 1, and, for example, when a frequency and voltage control register of the DSP 0 is set, an address "DSP 0_FVREG_ADRS" is accessed. An address of the shared memory SM is allocated after the area of each PU in the space.

Frequency and voltage control register setting is carried out by executing a register access object code through the task management PU decided by the compiler, and by accessing the frequency and voltage control register of a control destination PU via the local bus LBUS 19. A specific method by which the compiler generates the object code will be described later. To simply explain, in allocating tasks to the plurality of PUs, the compiler groups the plurality of PU groups, and determines a task management PU for starting the tasks of the group or executing synchronous processing. The compiler generates a code for executing frequency and voltage control in the management PU, and the management PU executes the code to carry out frequency and voltage control of the PU in the group. The compiler is executed by a computer (not shown).

Figure 17A:
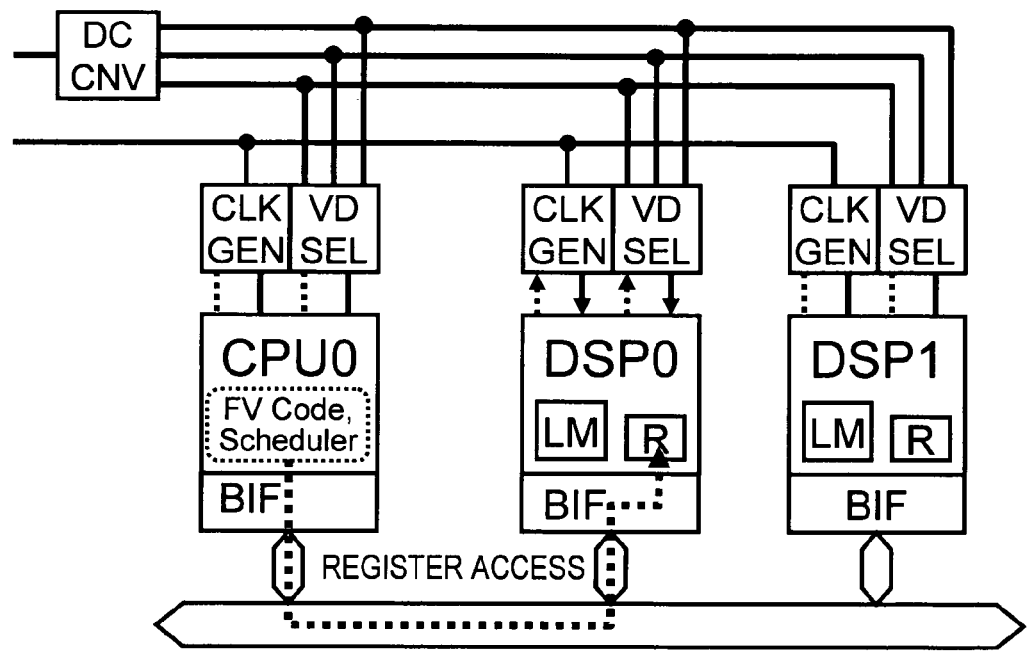
FIG. 17a is an explanatory diagram showing an example of frequency and voltage control register access in which a CPU 0 accesses a frequency and voltage control register of a DSP 0.

FIG. 17a shows an example of setting a frequency and voltage control register. It is presumed that the compiler groups the CPU 0, the DSP 0, and the DSP 1, the CPU 0 executes task management, and the CPU 0 executes frequency and voltage control for the DSP 0. The CPU 0 executes the object code generated by the compiler to execute FV setting to set a frequency and voltage control mode of the DSP 0.

FIG. 17b shows an example of an object code for setting the frequency and voltage control mode of the DSP 0. According to the example, an address of the frequency and voltage control register in the DSP 0 is predefined, the address of the frequency and voltage control register and a FV setting value are transferred to the general-purpose register in the CPU 0, and the setting value is written in a register designated by the address, thereby completing the setting.

According to the FV setting method, the object code by which the task management PU directly accesses the register is executed. Alternatively, as shown in FIG. 17c, when the operating system (hereinafter, referred to as OS) manages the FV operation mode of each PU, by calling a frequency and voltage control API of the OS, frequency and voltage control mode setting of the PU can be carried out under control of the OS.

It is also possible to provide a mechanism in which a frequency and voltage control register is set in the entire system and registers for setting frequency and voltage control modes of all the PUs 10 to 17 are set in the register such that FV modes are set to all the PUs 10 to 17 once modes are set in the registers. For example, as shown in the frequency and voltage control table 26 of FIG. 8, a register shared by all the PUs 10 to 17 are provided, such that the frequency and voltage control modes of all the PUs 10 to 17 can be changed by updating the register.

A plurality of frequency and voltage control registers may be provided in the control register of the entire system to set an FV mode for each type of PU in synchronization, depending on the types of processors such as a general-purpose processing PU group (CPU) or a dedicated processing PU group (DSP, DRP, and BMP). In this case, frequency and voltage control registers are provided for each type of processors in the frequency and voltage control table 26 of FIG. 8 and the frequency and voltage control register is shared among the CPU, the DSP, the DRP, and the BMP, thereby making it possible to change the frequency and voltage control mode for each type of processor by changing one register.

<BC Area>

Next, the broadcast (BC) area disposed in the head area of the memory map of FIG. 16 will be described. The BC area is a write-only area. When one PU writes data in one address of the BC area, the data is simultaneously written in LM entries of all the PUs correlated beforehand to the address via the local bus LBUS 19. Accordingly, the data shared by all the PUs is simultaneously held by the local memories LM of the PUs, and the PUs 10 to 17 can access the data of the LM at a high speed without accessing the shared memory SM.

Even in the case of executing system control such as frequency and voltage control, the broadcasting is carried out, thereby making it possible to simultaneously transmit control information to all the PUs. At this time, broadcasting mask information for designating a PU range may be transmitted together, to thereby realize a broadcast function of transmitting data or control information by limiting the PU range. As a result, for example, when the compiler defines a PU group constituted of a plurality of PUs to process tasks in parallel, task processing can be simultaneously started or frequency and voltage control can be executed in the PU group, thereby improving throughput of the entire system.

<Frequency and Voltage Control Concept during Task Processing>

Next, referring to FIGS. 18a to 18d, a concept of a power supply voltage and system frequency (FV) control method during task processing at the PUs 10 to 17 will be described. A task program executed at each PU is generated from an input program by a compiler described below. In other words, in the input program, a structure of the program is first analyzed by the compile described below, and divided, as macrotasks (MT), statement blocks of large grain sizes such as a basic block (BB), a repetition block (RB), and a subroutine (SB) which are constituted of assignment statements alone. According to the example, the structure is divided into three macrotasks MT 301 to MT 303. The macrotask is obtained by dividing the input program (i.e., source code) into a plurality of grain size unit blocks. In other words, through the division into the macrotasks, a multigrain parallel process is carried out to execute parallel processing by combining macrodata flow processing using parallel processing among rough grain size tasks such as subroutines and middle grain size parallel processing, which is loop level parallel processing, with near-fine grain size parallel processing using statement level parallelism in the basic block, in a tiered manner. According to this embodiment, program components and macrotask components are allocated to the PUs 10 to 17 as macrotasks and tasks, respectively.

Subsequently, by calculating characteristic information on calculation costs or the like at an optional PU of the macrotask MT, a PU in which the macrotask MT should be executed is decided, and data dependency and control dependency among the macrotasks MTs are analyzed to decide execution order of tasks.

Figure 18A:
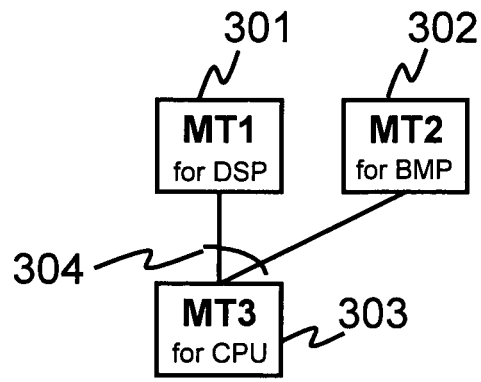
FIG. 18a is a macrotask graph of macrotask parallel execution dependency showing a concept of frequency and voltage control when tasks are processed in parallel.

FIG. 18a is a macrotask graph showing coarse-grain task parallelism. This graph shows that macrotasks MT 1 (301) and 2 (302) can be simultaneously executed, and a macrotask MT 3 (303) can be executed after an end of the execution of the macrotasks MT 1 (301) and 2 (302). According to the example, the macrotask MT 1 is arranged in the PU 10 (i.e., CPU 0), the macrotask MT 2 is arranged in the PU 12 (i.e., BMP 0) 12, and the macrotask MT 3 is arranged in the PU 10 (i.e., CPU 0).

Figure 18B:
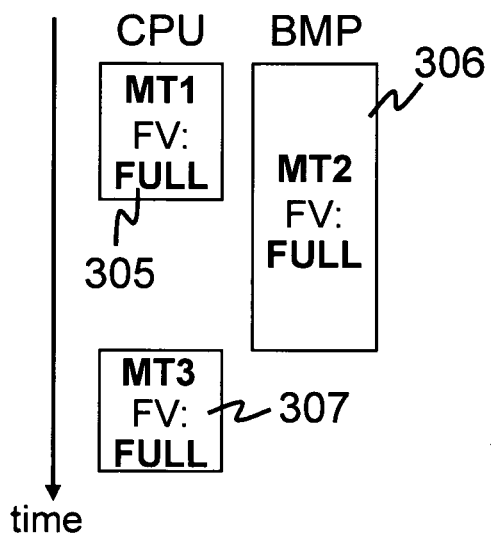
FIG. 18b is a Gantt chart when frequency and voltage control is not executed (i.e., FULL mode) showing the concept of frequency and voltage control when the tasks are processed in parallel.

FIG. 18b is a process Gantt chart when the macrotasks thus scheduled are normally processed (with no voltage/frequency control).

In FIG. 18b, as the macrotasks MT 1 and MT 2 can be executed in parallel, the MT 1 and the MT 2 are simultaneously started to be processed (305) (306) by the CPU (i.e., CPU 0) and the BMP (i.e., BMP 0), respectively. During normal processing, voltages supplied to the CPU and the BMP are both normal VD, and a normal FC is supplied as a system frequency. According to the example, as the number of processing cycles of the macrotask MT 1 at the CPU is smaller than that of the macrotask MT 2 at the BMP, the processing of the macrotask MT 1 (305) at the CPU is finished before the processing of the macrotask MT 2 (306) at the BMP is finished.

The CPU, which has finished the processing (305) of the macrotask MT 1, next processes the macrotask MT 3 (307). However, because of a dependency relation among the macrotasks MTs, the macrotask MT 3 to be processed next at the CPU cannot be executed until the end of the processing of the MT 2 (306) at the BMP. Therefore, the CPU is set in an idle state until the processing of the macrotask MT 2 is finished at the BMP. Even during the idle state, the normal power supply voltage VD and the clock FC is being supplied to the CPU, which leads to extra power consumption.

Figure 18C:
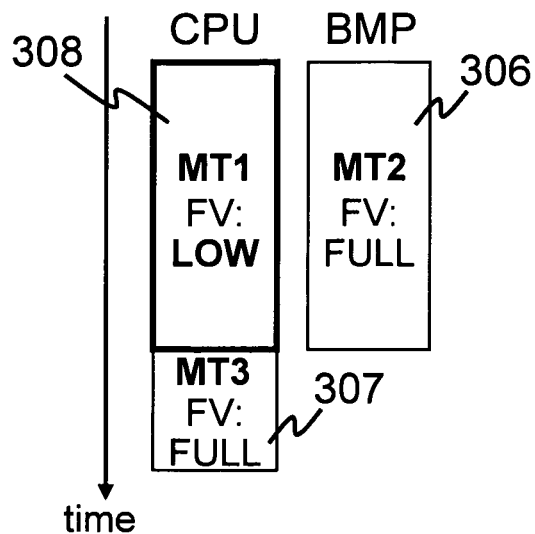
FIG. 18c is a Gantt chart of an example of frequency and voltage control when the CPU is continuously operated showing the concept of frequency and voltage control when the tasks are processed in parallel.

As one method for solving the problem, when the CPU executes the macrotask MT 1, the CPU is driven in a LOW mode (i.e., mode of supplying ¼ FC of FIG. 9) for reducing a system frequency of the CPU from that of a normal time (i.e., FULL mode) (308) so as to make time necessary for the BMP to process the macrotask MT 2 equal to the processing time of the macrotask MT 1 executed by the CPU. In other words, while the BMP is driven in the frequency and voltage control mode at FULL of the normal time, the frequency and voltage control mode of the CPU is set to a LOW mode, a system frequency of the PU whose processing is finished first is reduced, and a frequency and voltage control register is set so that different frequency and voltage control modes are set among the PUs which execute parallel processing. FIG. 18c is a Gantt chart when the frequency and voltage control of this method is applied. The compiler estimates the number of processing cycles of the macrotask MT 1 at the CPU (CPU 0) and the number of processing cycles of the macrotask MT 2 at the BMP (BMP 0) to decide system frequency of the CPU so that processing times of both can be equal. As a result, since the system frequency of the CPU is reduced, a power supply voltage VL to the PU can also be reduced, thereby optimizing power consumption.

In other words, according to this example, for the macrotask MT 1, the frequency and voltage control mode of the CPU is set to the "LOW mode" of FIG. 9, and the frequency and voltage control mode of the BMP which executes parallel processing is set to "FULL".

Figure 18D:
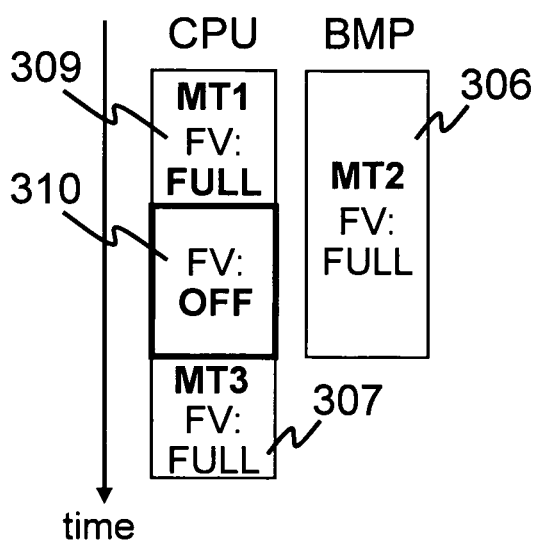
FIG. 18d is a Gantt chart of an example of frequency and voltage control when the CPU is temporarily stopped showing the concept of the frequency and voltage control when the tasks are processed in parallel.

As another method of solving the idle state of the CPU of FIG. 18b, at the end time of the processing of the macrotask MT 1 at the CPU (309), the supply of the power supply voltage and the system clock of the CPU are cut off to set a standby state (310). In other words, when the CPU completes the processing of the macrotask MT 1, the frequency and voltage control mode of the CPU is set to "OFF" of FIG. 9. Then, at the start time of the macrotask MT 3, the frequency and voltage control mode is set to "FULL" to resume the processing. FIG. 18d is a Gantt chart when the frequency and voltage control of this method is applied.

In FIG. 18d, the processing of the macrotask MT 1 of the CPU is finished before the macrotask MT 2 of the BMP (306) is finished. However, at the end time, the CPU is set in a standby state (OFF), a normal power supply voltage and a normal system clock are supplied to return the CPU to the normal state when the BMP finishes the processing of the macrotask MT 2 (306), and processing of the macrotask MT 3 (307) is started. As a result, as the operation is stopped without setting the CPU to be idle, power consumption can be reduced.

Accordingly, when the programs (i.e., tasks) are compiled, the compiler estimates processing times beforehand based on the configuration of the PU, decides processing order beforehand regarding parts whose processing order can be statically decided during compiling, and executes precise system frequency control and power management for each PU. Hence, power consumption can be optimized without reducing performance of the multiprocessing system.

<Concept of Frequency and Voltage Control during Task Processing (Real-time Regulations)>

The FC control method in the case where execution conditions of the macrotask (MT) depends on the other macrotasks MTs has been described. It is also possible to provide another frequency and voltage control method targeting a real-time processing task having restrictions to be processed within a certain time, i.e., a processing time limit (i.e., allowance time) of the task is predetermined as shown in FIG. 19a.

Figure 19A:
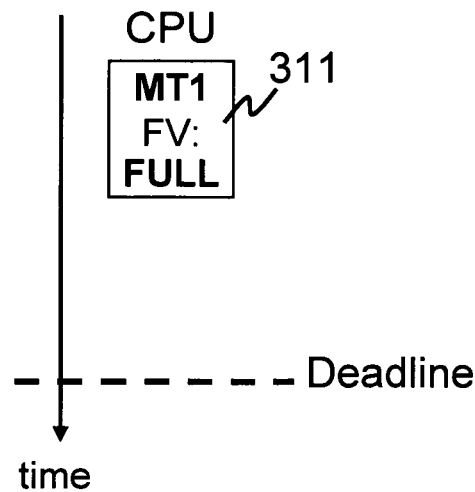
FIG. 19a is a Gantt chart of a normal real-time process showing frequency and voltage control during real-time restrictions.

When a macrotask (MT 1) 311 of FIG. 19a is processed in the "FULL" mode, in other words, when processed by a CPU operated by a normal power supply voltage and a normal system frequency, the processing is finished prior to a processing time limit (i.e. deadline). In this case, as there is still allowance for the original processing time limit while the CPU is set in an idle state at the end time of the processing, a system frequency of the CPU can be reduced within the processing time limit (312).

Figure 19B:
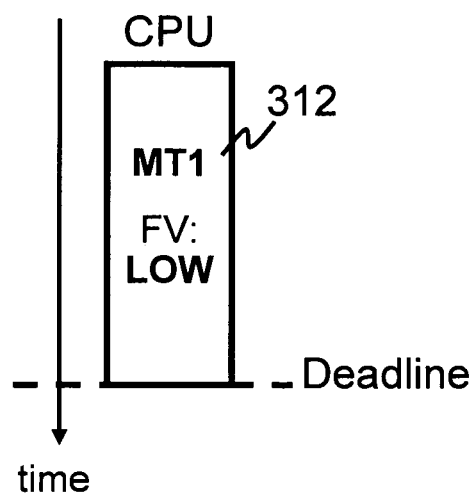
FIG. 19b is a Gantt chart of an example of frequency and voltage control when the CPU is continuously operated showing the frequency and voltage control during the real-time restrictions.

FIG. 19b is a Gantt chart in the case where the frequency and voltage control of this method is applied. The compiler estimates a system frequency to enable completion of the processing within the processing time limit, and decides a frequency and voltage control mode of the CPU to be a "LOW" mode as shown. As a result, a supply voltage VL can be reduced to optimize power consumption.

Figure 19C:
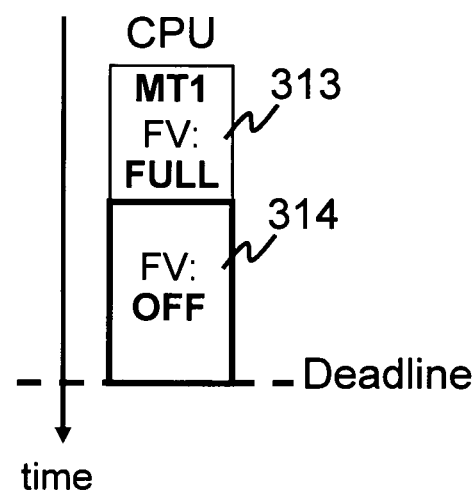
FIG. 19c is a Gantt chart of an example of frequency and voltage example when the CPU is temporarily stopped showing the frequency and voltage control during the real-time restrictions.

Similarly, by cutting off the power supply and the system clock of the CPU (314) at the end time of the processing (313) of the macrotask MT 1, power consumption may be reduced. FIG. 19c is a Gantt chart when the frequency and voltage control of this method is applied. In this case, the CPU processes the macrotask MT 1 in the "FULL" mode, and completes the processing within the processing time limit. However, the operation mode is set to "OFF" when the macrotask MT 1 is completed, to thereby save useless power consumption.

<Processing Flow of Compiler>

Figure 20:
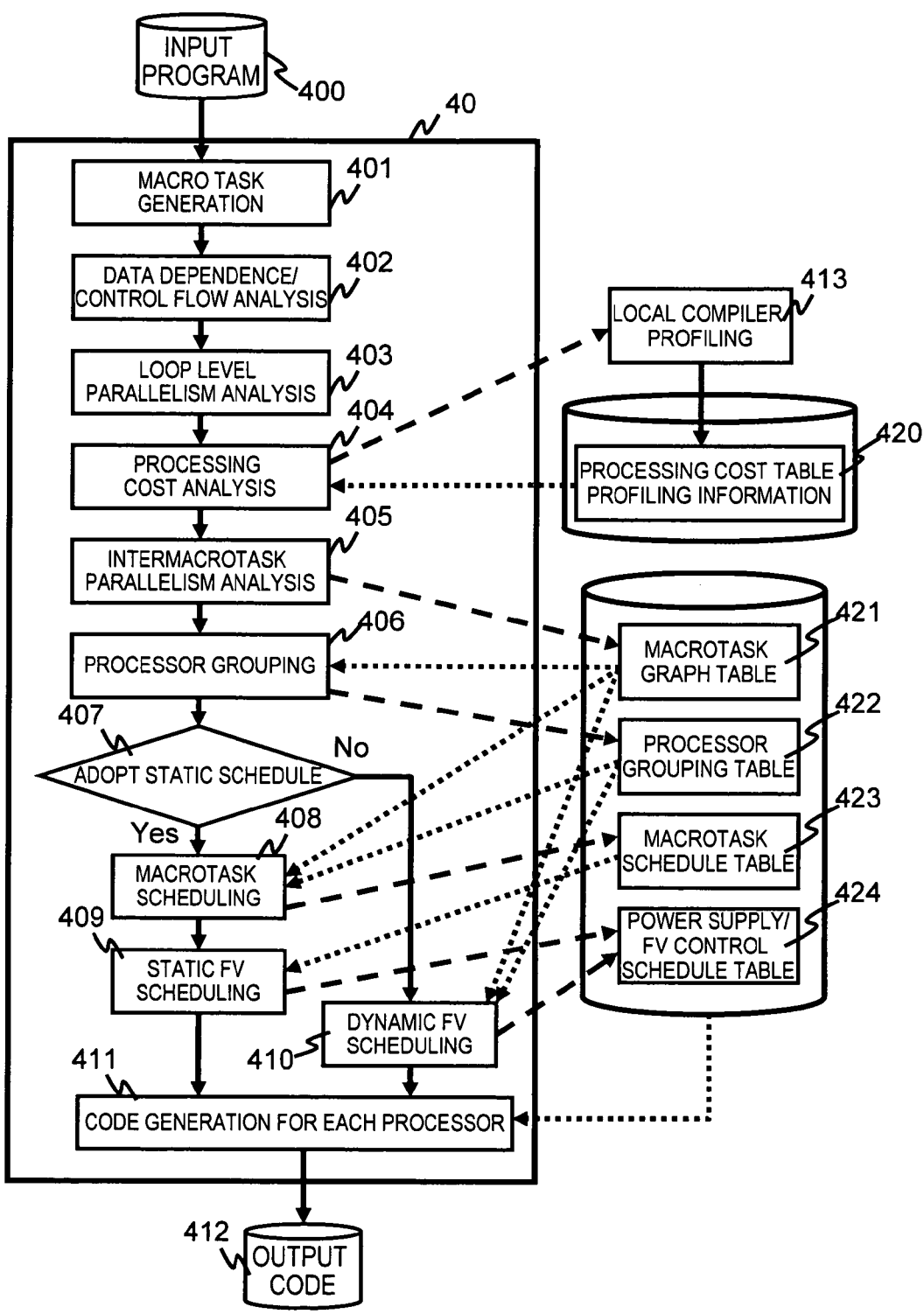
FIG. 20 is a flowchart showing a compiler process.

Next, a compiling method for generating codes to execute scheduling according to characteristics of the processor unit (PU) and power consumption optimization control based on a dynamic voltage/frequency change in the aforementioned multiprocessor architecture, and processing of the compiler employing the method will sequentially be described. FIG. 20 shows a processing flow of the compiler 40 employing the method.

<Generation of Macrotask>

An input program 400 of a sequential structure described in high-level language such as C or Fortran first analyzes the program structure to be divided into three kinds of coarse-grain macrotasks (MT) of a repetition block (RB), a subroutine (SB), and a block of pseudo assignment statements (BPA) to generate macrotasks (401). The RB is a loop block, and an outermost loop in each tier, the BPA is a block obtained by combining or dividing a plurality of basic blocks constituted of assignment statements with consideration given to scheduling overhead or parallelism. FIG. 21 shows an example of the input program (i.e., source program 400).

<Directive Designation>

In the source program 400, PU allocation can be described beforehand. For example, allocation of a given subroutine to the DSP and a given subroutine to the CPU can be explicitly designated. As a result, the DSP subroutine is subjected to further parallelism analysis by the compiler 40, and when there are four DSPs, for example, the compiler 40 executes parallelization scheduling for the four DSPs.

<Data Dependence/Control Flow Analysis>

Subsequently, a control flow and data dependency among the divided and generated tasks is analyzed, and an execution order relation of the macrotasks MTs is extracted (402). As the input program 400 of FIG. 21 is sequentially described, execution codes generated by the normal compiler 40 are executed in sequential order as in the case of the structure of the program. However, in many cases, it is not always necessary to execute the codes in the described order in terms of the relationship among the macrotasks MTs.

In other words, when there is no dependency of control or data reference among the macrotasks MTs, especially in the multiprocessor system, it is important to execute scheduling simultaneously or changing the order by arranging a plurality of macrotasks MTs in a plurality of PUs to shorten the overall execution time.

To execute such scheduling, parallelism among the MTs must be analyzed. As a preparation for this analysis, an execution order relation among the macrotasks MTs is extracted by a data dependence/control flow analysis process 402.

<Loop Level Parallelism Analysis>

Subsequently, as middle grain size level parallelism analysis in the macrotask MT, loop level parallelization is carried out (403). In the loop level parallelization 403, data dependency among loop repetition (i.e., iteration) units is analyzed to determine whether each iteration can be independently processed or not. If each iteration can be independently processed, iterations are allocated to the plurality of PUs to be subjected to parallel processing.

Loop parallelization is realized by various methods, e.g., dividing a single loop into a plurality of loops to increase parallelism, copying data or expanding arrangement variables to delete data dependency among the loops thereby realizing parallelization, and combining a plurality of loops into a single loop to reduce overhead necessary for loop control.

<Processing Cost Analysis>

Next, processing cost analysis is carried out to estimate a processing cycle necessary when the generated macrotask MT is executed at each PU (404). For a method of estimating processing costs (i.e., calculation costs), for example, regarding the CPU the following can be adopted. That is, the number of cycles necessary at a command level such as multiplication or addition is held as profiling information in a processing cost table 420 and the number of sequential processing cycles when the macrotask MT is executed at the PU is estimated with reference to the table 420.

When it is difficult to estimate the number of cycles at an object-code level in such devices as the DRP or the DSP which handles multiple amount of data with one command, each local compiler generating an object code of the device is called by the compiler 40 and estimates execution cycles on the converted execution codes by the local compiler (413). The local compiler is preset corresponding to a type of a PU. For example, DSP local compiler profiling information is used in the case of the DSP, and DRP local compiler profiling information is used in the case of the DRP.

When a branch is included, or when a size of a loop or a size of an array cannot be determined before the execution of the macrotask MT, profiling may be once executed on supposed execution environment to calculate processing costs with increased accuracy. When this profiling is not executed but the macrotask MT includes a branch, cost calculation is carried out with a branch probability of 50%. Similarly, when the profiling is not executed and the number of loop iterations cannot be determined, a method in which the loop iteration number is set to a fixed number of times or the defined size of an array used in the loop is applied.

The processing costs have been defined as the number of processing cycles (time). However, it is also possible to define costs as power consumption, and carry out scheduling such that power consumption can be reduced to minimum. For example, an operation mode capable of reducing power consumption to minimum within the processing time limit is selected from among frequency and voltage control modes (frequency and system voltage) to be set, based on the number of processing cycles and the processing time limit to complete the macrotask MT. Alternatively, as power consumption of the PU can be estimated by the following equation: power consumption=system voltage (to the power of)2×driving frequency, a combination of frequency and voltage control modes capable of reducing power consumption to minimum within the processing time limit may be selected to execute scheduling. For example, processing is executed by only the LOW mode as shown in FIG. 19b, or a plurality of frequency and voltage control modes are combined as shown in FIG. 19c. Alternatively, it is possible to select a combination of frequency and voltage control modes with which processing time is minimum and power consumption is minimum.

<Intermacrotask Parallelism Analysis or Earliest Execution Condition Analysis>

After the processing costs of the macrotask MT have been determined, the compiler 40 determines parallelism among the macrotasks MTs, i.e., a condition (earliest execution condition) which permits execution of each macrotask MTG at the earliest, based on the result of simultaneously analyzing the control flow and the data dependency among the macrotasks MTs extracted by the data dependence/control flow analysis process 402 (405).

Figure 22:
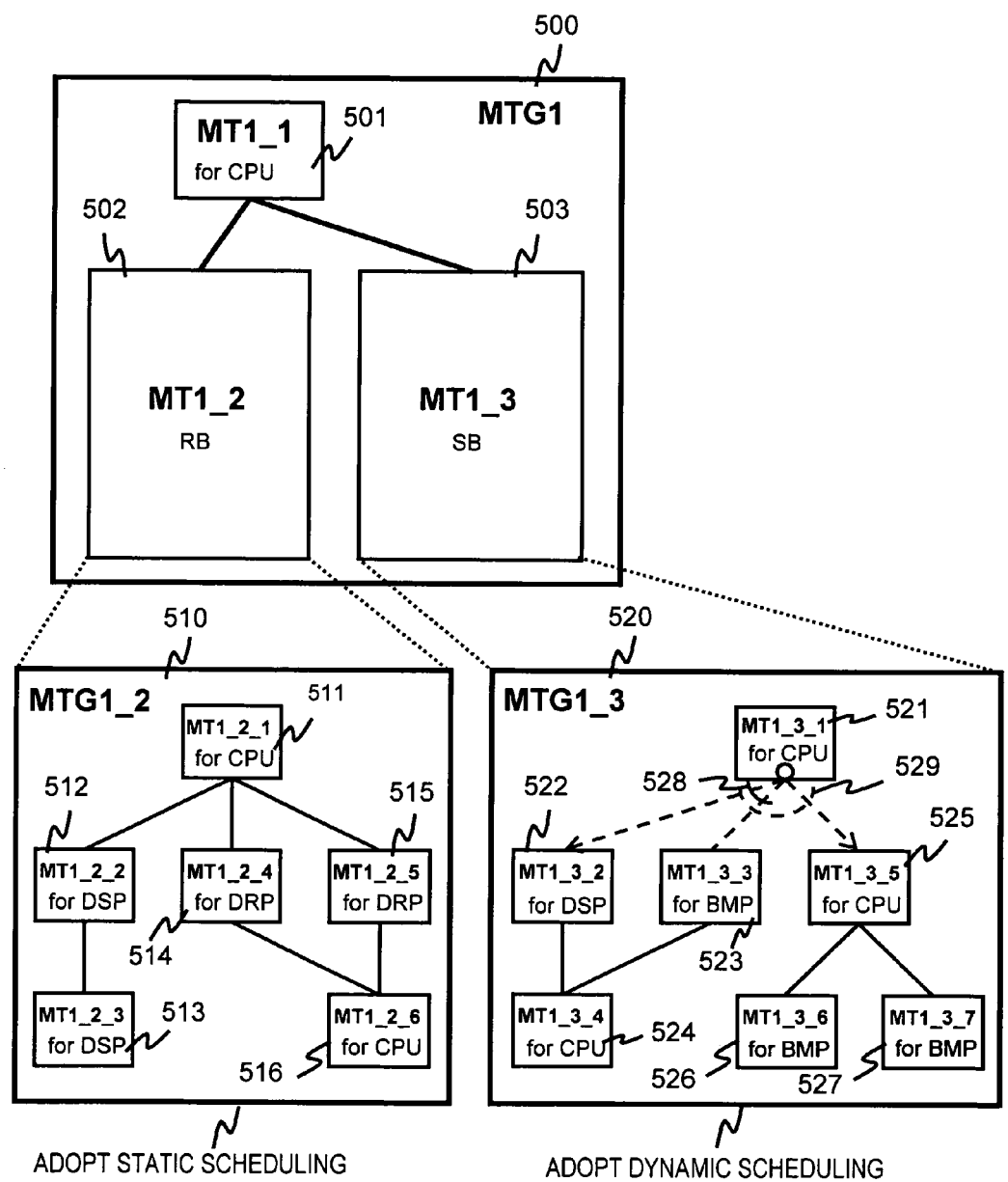
FIG. 22 is a diagram of a dependency relation among tasks generated by the compiler.

The earliest execution condition is visibly shown in a macrotask graph (MTG). FIG. 22 shows MTGs generated by analyzing the input program of FIG. 21. The result of parallelism analysis among the macrotasks is held as a macrotask graph table 421 in an external storage device to be used for a compiling process of a rear stage. This external storage device is a computer (not shown) for executing the compiler 40.

<Macrotask Graph>

Referring to FIG. 22, the macrotask MTG will be described below. Each node of the graph indicates a macrotask MT, a solid line between the nodes indicates a data dependency relation between the macrotasks, a broken line between the nodes indicates a control dependency relation between the macrotasks, and a small circle in the node indicates a condition branch. For example, solid lines extend from a macrotask MT 1_1 (501) to MT 1_2 (502) and to MT 1_3 (503). These lines indicate a dependency relation that processing is carried out by using data generated as a result of executing the MT 1_1 by the macrotasks MTs 1_1 and MT 1_3. Accordingly, as an execution order, the MT 1_2 and the MT 1_3 can be executed after the end of execution of the MT 1_1.

As the macrotask MT 1_2 (502) obtained from the input program 400 is a coarse-grain size block constituted of a plurality of loops or subroutines, the compiler 40 further divides the macrotask MT into a plurality of macrotasks MTs in a tiered manner. Therefore, in the macrotask graph MTG, a macrotask graph MTG 1_2 is further generated in another tier in the MT 1_2. In the case of the macrotask MT 1_3 (503), similarly, a macrotask graph MTGMTG 1_3 of another tier is generated.

In the case of the macrotask MTG 1_2 (510) in the macrotask MT 1_2 (502), the solid lines extend from a task MT 1_2_1 (511) to a task MT 1_2_2 (512), a task MT 1_2_4 (514), and a task MT 1_2_5 (515), after the end of execution of the MT 1_2_1 (511), these three tasks 512, 514 and 515 can be simultaneously executed.

Further, the task MT 1_2_2 (512) has dependence on a task MT 1_2_3 (513). In this case, it is only necessary to execute the task of the MT 1_2_3 (513) after the end of the task of the MT 1_2_2 (512). The solid lines extending from the tasks MT 1_2_4 (514) and MT 1_2_5 (515) to a task MT 1_2_6 (516) mean that the MT 1_2_6 can be executed when the execution of both tasks MT 1_2_4 (514) and MT 1_2_5 (515) is finished.

As described above, a task processing order considering parallelism in the macrotasks MTs 1_2 is established before execution, and tasks can be scheduled onto PUs beforehand in a fixed (static) manner at a compiling stage.

In the case of a macrotask graph MTG (520) in the macrotask MT 1_3 (503), there is a small circle in a macrotask MT 1_3_1 (521). This indicates that the task MT 1_3_1 (521) includes a condition branch. Broken lines with arrows extend from the small circle to tasks MT 1_3_2 (522) and MT 1_3_5 (525) and an arc 529 of a dotted line indicating an OR condition of control dependence is overlapped therewith, which indicates that the condition branches to one of the tasks MT 1_3_2 and MT 1_3_5.

A broken line with no arrow extends to a task MT 1_3_3 (523), and an arc 528 of a solid line indicating an AND condition in control dependence overlaps with the broken line with no arrow extending to the task MT 1_3_3 (522) and with a broken line connected to the task MT 1_3_2 (523). This indicates that if the process branches to the task MT 1_3_2 indicated by an arrow under this condition, the task MT 1_3_3 dependent for control on the same branch can simultaneously be executed. The broken lines shown in the drawing indicate a control dependency relation to establish task execution and a condition on which a task dependent on data is not executed. The broken line of the arrow indicates that the process is identical to the control flow (i.e., original) obtained in the data dependence/control flow analysis (402).

The condition branch of the task MT 1_3_1 (521) must be scheduled according to a situation of execution time as a branch direction is not established unless the task MT 1_3_1 is executed. When the condition branch is established and the process branches in the directions of the tasks MT 1_3_2 (522) and MT 1_3_3 (523), as solid lines indicating a data dependency relation extend from the tasks MT 1_3_2 (522) and MT 1_3_3 (523) to the task MT 1_3_4 (524), processing of the task MT 1_3_4 can be executed at the time when processing of both tasks MT (522 and 523) is finished.

When the process branches in the direction of the task MT 1_3_5 (525), processing of tasks MT 1_3_6 (526) and MT 1_3_7 (527) can be executed similarly to the above at the time when the task 525 is finished, due to the data dependency relation.

<Processor Grouping>

Next, the compiler 40 refers to the generated macrotask graph MTG table 421 to execute processor grouping according to a shape and parallelism of the macrotask graphs or an instruction from the user (406).

Specifically, shapes and parallelism of upper tier macrotasks MTs represented by the macrotask graph MTG, e.g., the macrotasks MT 1_2 (5202) and MT 1_3 (503) are analyzed, the PUs 10 to 17 necessary for processing the macrotasks MTs are grouped, and tasks MT are allocated to the groups. One group is formed of a set including at least one general-purpose processor (CPU) for controlling accelerator units (DSP, DRP, and BMP) in the group. That is, when a proper group configuration of processor PUs can be decided during compiling because of the configuration of the macrotask graph MTG, the compiler 40 executes grouping including the accelerator units.

When processor grouping cannot be executed during compiling because of the configuration of the macrotask graph MTG, i.e., when tasks to be used by the accelerator units are present in multiple tiers and grouping cannot properly be executed, the compiler 40 or the general-purpose processor functioning as a scheduler during execution allocates tasks to the accelerator units during compiling. In this case, when loads on the accelerator units are large, the general-purpose processor carries out the process instead of the accelerator units. Decided grouping information is held as a processor grouping table 422 in the external storage device to be used for processing of rear stages.

According to this embodiment, in the macrotask graph MTG 1 (500) of FIG. 22, processing costs of the macrotasks MT 1_2 (502) and MT 1_3 (503) are equal to each other, and the accelerator units must be controlled by the general-purpose processor during the execution of the macrotask graphs MTG 1_2 (510) and MTG 1_3 (520) in the macrotask. Therefore, two processor groups are defined.

Next, a configuration of the accelerator units necessary in each processor group is determined according to processing costs and parallelism of the PUs of the macrotasks MT 1_2 and MT 1_3. According to this embodiment, a necessary unit configuration can be realized by usable resources in the macrotask graph MTG 1, so a processor group is decided to be a CPU 0, a DSP 0, a DRP 0 and a DRP 1, and a CPU 1, a DSP 1, a BMP 0 and BMP 1 during compiling.

<Static Schedule and Dynamic Schedule>

The compiler 40 next decides which of a static schedule and a dynamic schedule to adopt as a scheduling method (407). Each scheduling method will be described below in detail, but brief explanation will be made first. In the case of a MT flow where there is no condition branch in a task MT but earliest execution conditions can be predetermined, the static schedule is applied, where the compiler 40 executes task MT scheduling beforehand to insert synchronous and frequency and voltage control codes (scheduling codes) among the tasks.

In the case of a MT flow unpredictable during compiling, e.g., there is a condition branch in the task MT, or processing time of the task MT fluctuates during execution, the dynamic schedule is applied, and the compiler 40 generates a scheduling program for executing control during execution according to a situation such as a branch. An advantage of generating the scheduling program (scheduling codes) by the compiler 40 is that overhead of several thousand to several tens of thousand clocks, which may be generated if generation of rough grain size tasks and scheduling are requested to the OS or the library as in the case of the conventional multiprocessor, can be avoided.

<Static Scheduling>

First, a process flow of the static scheduling will be described. According to the static scheduling, allocation and execution order of the tasks MT have already been decided during compiling. Therefore, first, a macrotask scheduling process 408 refers to information of the macrostatic table 421 and the processor grouping table 422 to generate control information to synchronize execution tasks of the PUs with one another or start other tasks, and to decide an insertion place of the control information.

Data transfer information is simultaneously generated to load data necessary for the task program or the task from the local memory LM of the other PU and the shared memory to the local memory LM of the PU. By such a data localization method, the local memory LM is effectively utilized to minimize a data transfer amount. The schedule information generated through the process is held as a macrotask schedule table 423 in the external storage device.

Subsequently, the compiler 40 executes a static FV scheduling process 409. Based on the frequency and voltage control concept during the task parallel processing execution described above with reference to FIGS. 18a to 18d, this process judges a margin determined by task processing costs and a schedule time limit (processing deadline) from the schedule information (macrotask schedule table) generated by the macrotask scheduling 408, and generates frequency and voltage control information to set a PU operation mode for deciding a system frequency/supply voltage according to the margin. The frequency and voltage control information is held as a power supply/frequency and voltage control schedule table 424 in the external storage device. For example, the margin is determined based on processing time from an execution start to execution completion and to the processing time limit, and indicates a performance margin of each of the PUs 10 to 17. For example, as shown in FIG. 19a, a margin is judged to be large if time from the execution completion to the processing time limit of the CPU 0 is long. On the other hand, a margin is judged to be short when time from the execution completion to the processing time limit is short.

The processing time limit (allowance time) may be described in the input program or input from a console (not shown) during the processing of the compiler 40.

<Dynamic Scheduling>

Next, a process flow of the dynamic scheduling will be described. According to the dynamic scheduling, scheduling contents cannot be decided during compiling because of uncertain data such as a condition branch in the task MT. Therefore, the compiler 40 generates a scheduling program to dynamically execute scheduling during program execution based on the processing result of the task MT (410). This program starts or synchronizes the tasks MT or loads data necessary for the MT, based on the processing result. Additionally, based on the frequency and voltage control concept of the task parallel processing execution time described above with reference to FIGS. 18a to 18d, the program sets an operation mode (frequency and voltage control mode) for deciding a system frequency/supply voltage of the PU. The generated scheduling program is held as a power supply/frequency and voltage control schedule table 424 in the external storage device.

<Generation of Scheduling Code>

Through the above process, the compiler 40 completes the scheduling of the input program 400 to the PUs 10 to 17. The pieces of scheduling information generated through the process have been stored as the tables (421 to 424) in the external storage device. The compiler 40 accesses the tables (421 to 424), reads the task execution order, the data transfer information, and the frequency and voltage control information, and adds, with respect to the input program, a control code (scheduling code) to the static schedule part of and a scheduling program to the dynamic schedule part (411). The control code is generated by, for example, using a MPI (message passing interface) which is a parallel programming standard interface of a distributed memory type multiprocessor system. The input program to which the codes have been added is processed by a local compiler prepared for each type of PU to be converted into an execution binary code of the PU (412). The local compiler is prepared for each type of PU of the CPU, the DSP, the DRP, and the BMP as descried above, and loads the local compiler according to each type of PU to generate an execution binary code.

<Result of Scheduling>

Figure 23:
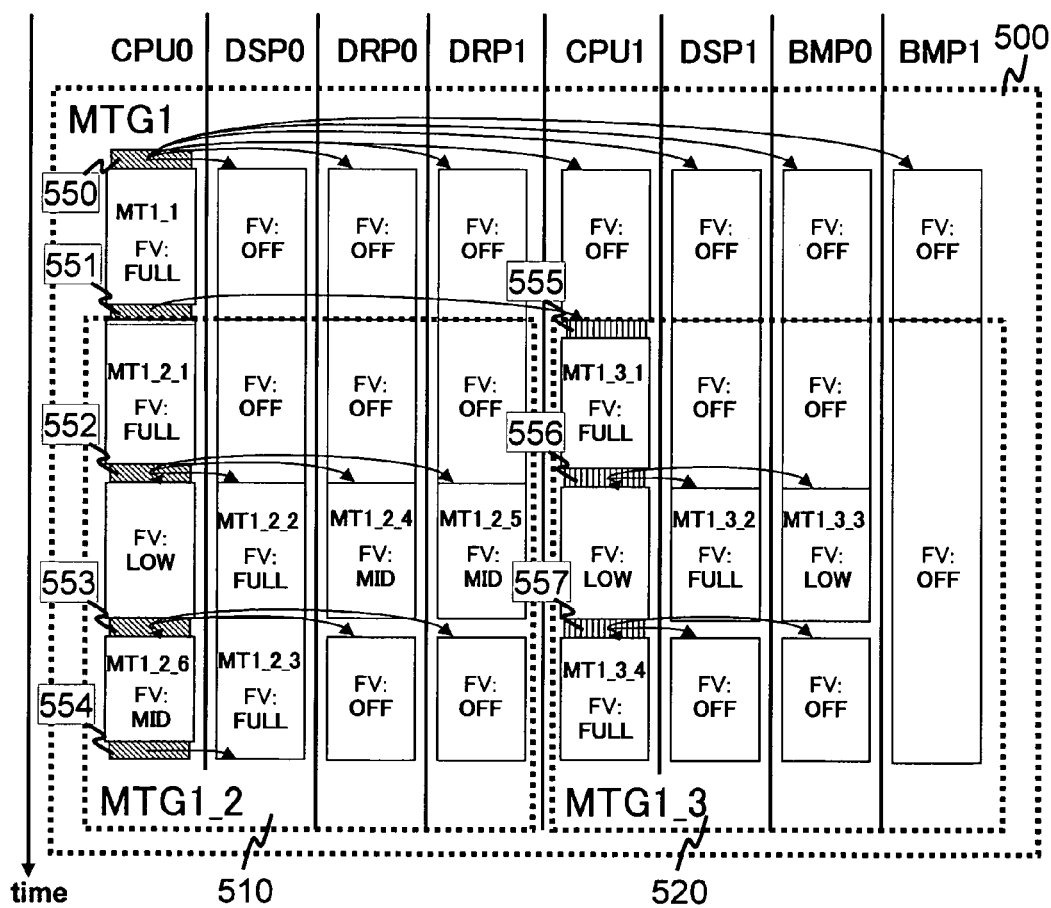
FIG. 23 is a time-sequential chart showing a result of task/frequency and voltage control scheduling.

FIG. 23 shows an example of a result of the scheduling. FIG. 23 shows the MT scheduling result for each PU based on a time axis. According to this example, as the CPU 0 executes management for starting or synchronizing of the tasks and frequency and voltage control, the control code 550 generated by the compiler 40 is first loaded to the CPU 0. The control code 550 is represented by a code for executing frequency and voltage control of each PU and a code for starting the macrotask MT 1_1 in the CPU 0. In other words, the CPU 0 sets a value of the frequency and voltage control register to "3" so that an operation mode of the CPU 0 for executing the macrotask MT 1_1 can be FULL. Since there is no MT to be processed for the other PU, a value of the frequency and voltage control register is set to "0" so that the operation can be OFF. Next, the CPU 0 starts processing of the macrostatic MT 1_1 by its own CPU 0.

After the processing end of the macrotask MT 1_1 in the CPU 0, the control code 551 generated by the compiler 40 is executed to set a frequency and voltage control mode. Tasks to be processed next are a task MT 1_2_1 and a task MT 1_3_1 designated by the macrotask graph MTG of the lower tier of the macrotasks MT 1_2 and MT 1_3. The former is executed by the CPU 0, and the latter is executed by the CPU 1.

Accordingly, the CPU 0 sets the frequency and voltage control register of the CPU 1 for processing the task MT 1_3_2 to a normal mode (FULL). Regarding the CPU 0, the frequency and voltage control mode has been set to a normal mode, but the normal mode (FULL) is maintained to successively process the MT 1_2_1.

In this case, as there is no task to be processed in the other PU during the processing of the task MT 1_2_1 and the task MT 1_3_1, an operation mode is maintained OFF for the other PU. Then, the CPU 0 starts processing of the task MT 1_2_1 by its own CPU 0 and the task MT 1_3_1 by the CPU 1.

As described above, the scheduling has been executed during compiling, since the macrotask MTG 1_2 includes no condition branch (static scheduling). The tasks MT are allocated to the group of the CPU 0, the DSP 0, the DRP 0, and the DP 1. As the macrotask MTG 1_3 includes a condition branch, a program for executing scheduling during execution is added, and the tasks MT are allocated to the group of the CPU 1, the DSP 1, the BMP 0 and the BMP 1 based on an execution result.

Next, scheduling of the task MT group of the macrotask graph MTG 1_2 will be described. Upon an end of the execution of the task MT 1_2_1 at the CPU 0, the CPU 0 executes the control code 552, and sets the frequency and voltage control register to "3" to set the DSP 0 to a normal operation mode FULL so as to process the task MT 1_2_2. In the case of the tasks MT 1_2_4 and MT 1_2_5, the frequency and voltage control register is set to "2" to set the DRP 0 and the DRP 1 to a low-power operation mode MIDDLE, based on margin judgment of the tasks by the FV scheduling during compiling. There is no MT to be executed by the CPU 0, but the CPU 0 executes the scheduler to manage the tasks of the DSP 0, the DRP 0, and the DRP 1 in synchronization. Therefore, the scheduler sets the frequency and voltage control register to "1" to set a low-power operation mode LOW for the CPU 0. Then, processing of the task MT 1_2_2, the task MT 1_2_4, and the task MT 1_2_5 are started. After the MT processing end, the task MT 1_2_3 is similarly executed at the DSP 0. Accordingly, task start reservation (task registration in task ready queue) is made for the task MT 1_2_2 to start the task MT 1_2_3 at the end of the task MT 1_2_2.

Next, upon judging that the processing of the task MT 1_2_4 and the task MT 1_2_5 have both been finished, the CPU 0 executes the control code 553, sets the operation mode of its own CPU for processing the task MT 1_2_6 to MIDDLE, operation modes of the DRP 0 and the DRP 1 to OFF as there is no task to be processed in the DRP 1, and processing of the task MT 1_2_6 is started in a state where a voltage and a system frequency are reduced from normal levels. Upon end of a processing of the task MT 1_2_6, the CPU 0 executes the control code 554. Upon judging that the processing of the task MT 1_2_3 has been finished, the CPU 0 sets the operation mode of the DSP 0 to OFF as task processing has been completed in the MTG 1_2 group.

Next, a task MT group of the MTG 1_3 will be described. The macrotask MT 1_3 includes a branch, whose direction cannot be identified unless the task is executed. Accordingly, a dynamic scheduler 555 for loading the task and data, starting the task, and managing the synchronous and frequency and voltage control codes depending on a situation during execution is executed by the CPU 1. The scheduler 555 first sets an operation mode of the CPU 1 to FULL to execute the task MT 1_3_1, and starts the task MT 1_3_1. After the execution end of the task MT 1_3_1, the scheduler 556 judges a branch direction to determine a task to be started next.

According to the scheduling shown in FIG. 23, the task MT 1_3_2 is processed by the DSP 1, and the task MT 1_3_3 is processed by the BMP 0. Before the start of the processing, the scheduler 556 sets an operation mode of the DSP 1 to FULL and an operation mode of the BMP 0 to LOW according to the FV scheduling result. Though there is no task MT to be executed in the CPU 1, the CPU 1 executes the scheduler 556 to carry out task management of the DSP 1 and the BMP 0. Therefore, the scheduler 556 sets an operation mode of the CPU 1 to a low-power mode LOW.

Next, upon judging of the processing end of both of the task MT 1_3_2 and the task MT 1_3_3, the dynamic scheduler 557 of the CPU 0 sets an operation mode (frequency and voltage control mode) of its own CPU 0 for processing the task MT 1_3_4 to FULL, and operation modes of the DSP 1 and the BMP 0 having no tasks to be executed to OFF. Then; the task MT 1_3_4 is executed by its own CPU 0.

As described above, in the multiprocessor constituted of the PUs 10 to 17 of different types, the input programs are parallelized and scheduled by the multigrain parallel processing so as to reduce the execution time to minimum, and then system frequency control and power supply management are precisely carried out for each PU. Hence, it is possible to reduce power consumption within the minimum execution time without deteriorating performance.

<Object Program Generated by Compiler>

FIGS. 24 and 25 show examples of output programs (object codes) obtained by adding the scheduling codes described above for scheduling to the input program 400 and outputted for each PU by the compiler 40. FIGS. 24 and 25, the processing shown in FIG. 23 is described. FIG. 24 shows execution codes of the CPU 0, the DSP 0, the DRP 0, and the DRP 1 are shown as a processor group for processing the macrotask MTG 1_2. FIG. 25 shows PU execution codes of the CPU 1, the DSP 1, the BMP 0, and the BMP 1 as a processor group for processing the macrotask MTG 1_3. The generated codes of the compiler 40 are represented by pseudo codes which are actually represented according to an interface standard such as MPI as described above.

<CONCLUSION>

As described above, this invention provides the multiprocessor system where various processor units PU are integrated, in which the program is divided to be arranged for efficient operation of the PUs and the compiler 40 generates the control code to thereby carry out the process efficiently with low power within minimum processing time while making best use of the performance of the system. Moreover, the software developer can create highly efficient programs within a short time without giving consideration to the processor configuration.

<Supplement>

The embodiment has been described by way of example where the multiprocessor system equipped with the plurality of PUs 10 to 17 in one chip is applied to this invention. However, the multiprocessor system can also be applied to a parallel computer of FIG. 1 equipped with a plurality of chips, and operation effects similar to the above can be obtained.

According to at least one embodiment, the multigrain parallelization compiler is characterized in that the number of processing cycles for processing the unit blocks is obtained based on the profiling information set for each processor unit, and the calculation cycle time is obtained from the processing cycles.

According to another embodiment, the multigrain parallelization compiler is characterized in that the unit blocks are converted into execution codes by the local compiler set for each processor unit, the number of processing cycles for processing the unit blocks is obtained based on the profiling information set for each processor unit, and the calculation cycle time is obtained based on the number of processing cycles.

According to a further embodiment, the multigrain parallelization compiler is characterized in that the number of processing cycles for processing the unit blocks is obtained based on the profiling information set for each processor unit, and the power is obtained from the processing cycles.

According to a further embodiment, the multigrain parallelization compiler is characterized in that, as regards the calculation cycle time, the unit blocks are converted into execution codes by the local compiler set for each processor unit, the number of processing cycles for processing the unit blocks is obtained based on the profiling information set for each processor unit, and the power is obtained based on the number of processing cycles.

According to yet another embodiment, the multigrain parallelization compiler is characterized in that: the process of extracting the parallelism of the unit blocks includes a process of storing the extracted unit blocks in the macrotask graph table, and grouping the processor units necessary for processing the unit blocks to store the group in the processor grouping table; and the process of generating the scheduling codes includes a process of referring to the macrotask graph table, the processor grouping table, and the cost information to generate control codes for the processor units, and a process of inserting the control codes according to execution order of the unit blocks.

According to an even further embodiment, the multigrain parallelization compiler is characterized in that: the process of extracting the parallelism of the unit blocks includes a process of storing the extracted unit blocks in the macrotask table, and grouping the processor units necessary for processing the unit blocks to store the group in the processor grouping table; and the process of generating the scheduling codes includes a process of referring to the macrotask graph table, the processor grouping table, and the cost information to generate a scheduling program for dynamically scheduling the unit blocks, and a process of inserting the scheduling program according to the execution order of the unit blocks.

INDUSTRIAL APPLICABILITY

According to this invention, there is provided a multiprocessor system where various PUs are integrated, in which the program is divided to be arranged for efficient operation of the PU and the compiler generates the control code, to thereby efficiently carry out the process with low power while making best use of the performance of the processor system. The software developer can efficiently create programs within a short time without giving consideration to the processor configuration. As a result, this invention can be applied to an LSI for use in a car navigation system, a portable telephone, or information appliance, which is strongly required to carry out a process with high calculation performance and with low power at the same time, to thereby attain functions of performing high-quality moving image production or voice processing, and image or voice recognition. This invention can also be applied to an LSI for use in an information or control system of an automobile, with which automatic driving or safe driving system can be realized. Further, the invention can be applied in the future to a supercomputer which is required to have very high microprocessing power at low power consumption

The invention claimed is:

1. A multiprocessor system having processor units that include a single type or a plurality of types of processors, the multiprocessor system comprising:

a clock supply unit for supplying one of a plurality of clock frequencies as a system clock to each of the processor units;

a power supply unit for supplying one of a plurality of voltages as a system voltage to each of the processor units;

a respective local memory provided in each processor unit and arranged to store data or commands;

a shared memory accessed by the processor units;

a local bus connecting the shared memory to the processor units; and a respective system control register provided in each processor unit for setting the system clock and the system voltage to be supplied to the processor and the respective local memory in the processor unit, wherein the respective system control register in each processor unit includes bit fields that respectively store values of clock frequencies and system voltages to be set for elements in the processor unit, and wherein the respective system control register in each processor unit is assigned an address to access the system control register, and furthermore each bit field of each respective system control register is assigned a respective individual address to allow direct access to each bit field and the values stored in each bit field by another processor unit.

2. The multiprocessor system according to claim 1, wherein at least one of the respective local memory and a respective cache memory in each processor unit is divided into a plurality of banks, and wherein the respective system control register in each processor unit includes bit fields that respectively stores values of clock frequencies and system voltages to be set for the plurality of banks of the processor unit.

3. The multiprocessor system according to claim 1, wherein the respective system control register in each processor unit and the bit fields of the respective system control register have other addresses in a broadcast area in the global address space, and wherein each of the bit fields of the respective system control register in each processor unit is arranged to store values of clock frequencies and system voltages when the processor unit writes the values to the broadcast area.

4. The multiprocessor system according to claim 1, wherein the local bus and the shared memory include system control registers having bit fields for storing values of clock frequencies and system voltages for the local bus, the shared memory, and a plurality of banks formed by dividing the shared memory, and wherein the bit fields of the system control registers of the local bus and the shared memory have global addresses and addresses in a broadcast area in a global address space.

5. The multiprocessor system according to claim 1, wherein the system control register in each processor unit is assigned a private address and a global address, and wherein each of the bit fields of the system control register is assigned a private address and a global address.

6. A multiprocessor system having processor units that include a single type or a plurality of types of processors, the multiprocessor system comprising:

a clock supply unit for supplying one of a plurality of clock frequencies as a system clock to each of the processor units;

a power supply unit for supplying one of a plurality of voltages as a system voltage to each of the processor units;

a local memory provided in each processor unit and arranged to store data or commands;

a shared memory accessed by the processor units;

a local bus connecting the shared memory to the processor units; and a system control register provided in each processor unit for setting the system clock and the system voltage to be supplied to the processor and the respective local memory in the processor unit, wherein the system control register in each processor unit includes bit fields that store values of clock frequencies and system voltages to be set for respective elements in the processor unit, and wherein the system control register in each processor unit is assigned an address to access the system control register, and furthermore each bit field of the system control register is assigned an individual address to allow direct access to each bit field and the values stored in each bit field by another processor unit.

* * * * *